United States Patent
Emura et al.

(10) Patent No.: US 9,873,287 B2
(45) Date of Patent: Jan. 23, 2018

(54) BICYCLE HUB ASSEMBLY AND BICYCLE TRANSMISSION SYSTEM

(71) Applicant: SHIMANO INC., Sakai (JP)

(72) Inventors: Atsuhiro Emura, Sakai (JP); Toshinari Oishi, Sakai (JP); Yusuke Nishimoto, Sakai (JP); Sota Yamaguchi, Sakai (JP); Kohei Obuchi, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/056,931

(22) Filed: Feb. 29, 2016

(65) Prior Publication Data

US 2017/0246904 A1    Aug. 31, 2017

(51) Int. Cl.
| | |
|---|---|
| B60B 27/02 | (2006.01) |
| B62M 9/10 | (2006.01) |
| B60B 27/00 | (2006.01) |
| F16D 28/00 | (2006.01) |
| F16D 41/24 | (2006.01) |
| F16D 48/06 | (2006.01) |
| B60B 27/04 | (2006.01) |

(52) U.S. Cl.
CPC ........ *B60B 27/023* (2013.01); *B60B 27/0031* (2013.01); *B60B 27/047* (2013.01); *B62M 9/10* (2013.01); *F16D 28/00* (2013.01); *F16D 41/24* (2013.01); *F16D 48/06* (2013.01); *B60Y 2200/13* (2013.01)

(58) Field of Classification Search
None
See application file for complete search history.

(56) References Cited

U.S. PATENT DOCUMENTS

| | | | | |
|---|---|---|---|---|
| 3,492,883 A | * | 2/1970 | Maeda | B62M 9/10 |
| | | | | 192/48.92 |
| 5,426,997 A | * | 6/1995 | Brion | B62M 9/105 |
| | | | | 192/64 |
| 5,611,556 A | | 3/1997 | Davidow | |
| 5,964,332 A | * | 10/1999 | King | B60B 27/023 |
| | | | | 192/46 |
| 6,029,990 A | | 2/2000 | Busby | |
| 6,079,726 A | | 6/2000 | Busby | |
| 6,155,585 A | | 12/2000 | Busby | |

(Continued)

FOREIGN PATENT DOCUMENTS

| | | |
|---|---|---|
| JP | 4535958 B2 | 2/2007 |
| JP | 5246656 B2 | 4/2010 |
| WO | WO 2011/061048 | 5/2011 |

*Primary Examiner* — Mark A Manley
(74) *Attorney, Agent, or Firm* — Mori & Ward, LLP

(57) ABSTRACT

A bicycle hub assembly comprises a hub axle, a hub shell, a sprocket support body, and a clutch. The sprocket support body is rotatably mounted on the hub axle to rotate about a rotational axis. The sprocket support body is rotatable relative to the hub axle and the hub shell about the rotational axis. The clutch has a first coupling state where a pedaling rotational force is transmitted from the sprocket support body to the hub shell in a first rotational direction during pedaling, a first release state where the hub shell is rotatable relative to the sprocket support body in the first rotational direction during coasting, and a second coupling state where a coasting rotational force is transmitted from the hub shell to the sprocket support body in the first rotational direction during coasting.

20 Claims, 33 Drawing Sheets

(56) References Cited

U.S. PATENT DOCUMENTS

| | | |
|---|---|---|
| 7,326,137 B2 | 2/2008 | van der Linde |
| 7,361,109 B2 | 4/2008 | Kilshaw |
| 7,597,638 B2 | 10/2009 | Cooke |
| 7,762,571 B2 | 7/2010 | Dodman et al. |
| 8,066,596 B1 | 11/2011 | Kilshaw |
| 8,475,306 B2 | 7/2013 | Vrielink |
| 8,556,757 B2 | 10/2013 | Kilshaw |
| 2004/0067804 A1 | 4/2004 | Dratewski |
| 2008/0261735 A1 | 10/2008 | Cappellini |
| 2011/0256971 A1 | 10/2011 | Kilshaw |
| 2014/0060992 A1* | 3/2014 | Spahr ............... F16D 27/01 192/64 |

* cited by examiner

| | | SECOND TRANSMISSION MEMBER | | | | | | |
|---|---|---|---|---|---|---|---|---|
| | | CW27 | CW26 | CW25 | CW24 | CW23 | CW22 | CW21 |
| | | 41 | 37 | 33 | 29 | 25 | 21 | 19 |
| FIRST TRANSMISSION MEMBER | CW11 19 | 0.46 | 0.51 | 0.58 | 0.66 | 0.76 | 0.90 | 1.00 |
| | CW12 21 | 0.51 | 0.57 | 0.64 | 0.72 | 0.84 | 1.00 | 1.11 |
| | CW13 25 | 0.61 | 0.68 | 0.76 | 0.86 | 1.00 | 1.19 | 1.32 |
| | CW14 29 | 0.71 | 0.78 | 0.88 | 1.00 | 1.16 | 1.38 | 1.53 |
| | CW15 33 | 0.80 | 0.89 | 1.00 | 1.14 | 1.32 | 1.57 | 1.74 |
| | CW16 37 | 0.90 | 1.00 | 1.12 | 1.28 | 1.48 | 1.76 | 1.95 |
| | CW17 41 | 1.00 | 1.11 | 1.24 | 1.41 | 1.64 | 1.95 | 2.16 |

| SPEED STAGE | FIRST TRANSMISSION MEMBER | GUIDE MEMBER | FIRST COGWHEEL | SECOND COGWHEEL |
|---|---|---|---|---|
| 1 | P1 | P11 | CW11 | CW27 |
| 2 | P2 | P11 | CW12 | CW27 |
| 3 | P1 | P12 | CW12 | CW26 |
| 4 | P2 | P12 | CW13 | CW26 |
| 5 | P1 | P13 | CW13 | CW25 |
| 6 | P2 | P13 | CW14 | CW25 |
| 7 | P1 | P14 | CW14 | CW24 |
| 8 | P2 | P14 | CW15 | CW24 |
| 9 | P1 | P15 | CW15 | CW23 |
| 10 | P2 | P15 | CW16 | CW23 |
| 11 | P1 | P16 | CW16 | CW22 |
| 12 | P2 | P16 | CW17 | CW22 |
| 13 | P1 | P17 | CW17 | CW21 |

BICYCLE HUB ASSEMBLY AND BICYCLE TRANSMISSION SYSTEM

BACKGROUND OF THE INVENTION

Field of the Invention

The present invention relates to a bicycle hub assembly and a bicycle transmission system.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a transmission system.

SUMMARY OF THE INVENTION

In accordance with a first aspect of the present invention, a bicycle hub assembly comprises a hub axle, a hub shell, a sprocket support body, and a clutch. The hub axle defines a rotational axis. The hub shell is rotatably mounted on the hub axle to rotate about the rotational axis. The sprocket support body is rotatably mounted on the hub axle to rotate about the rotational axis. The sprocket support body is rotatable relative to the hub axle and the hub shell about the rotational axis. The clutch has a first coupling state where a pedaling rotational force is transmitted from the sprocket support body to the hub shell in a first rotational direction during pedaling, a first release state where the hub shell is rotatable relative to the sprocket support body in the first rotational direction during coasting, and a second coupling state where a coasting rotational force is transmitted from the hub shell to the sprocket support body in the first rotational direction during coasting.

With the bicycle hub assembly according to the first aspect, it is possible to rotate the sprocket support body about the rotational axis in the first rotational direction even during coasting when a state of the clutch is changed from the first release state to the second coupling state. This allows a bicycle transmission apparatus to change a speed stage among a plurality of speed stages defined by sprocket wheels mounted on the sprocket support body even during coasting. Accordingly, it is possible to utilize a time period of coasting to change the shift position.

In accordance with a second aspect of the present invention, the bicycle hub assembly according to the first aspect is configured so that the hub shell includes at least one first tooth. The sprocket support body includes a first helical spline. The clutch includes a first ratchet member and a second ratchet member. The first ratchet member includes at least one first ratchet tooth and a second helical spline engaged with the first helical spline. The second ratchet member includes at least one second ratchet tooth and at least one second tooth. The at least one second ratchet tooth is engageable with the at least one first ratchet tooth. The at least one second tooth is engaged with the at least one first tooth.

With the bicycle hub assembly according to the second aspect, the first helical spline and the second helical spline move the first ratchet member relative to the sprocket support body when the first ratchet member rotates relative to the sprocket support body. Thus, it is possible to move the first ratchet member relative to the sprocket support body to bring the at least one first ratchet tooth into engagement with the at least one second ratchet tooth using a relative rotation between the first ratchet member and the sprocket support body. Accordingly, it is possible to change the state of the clutch between the first coupling state and the first release state.

In accordance with a third aspect of the present invention, the bicycle hub assembly according to the second aspect is configured so that the clutch includes an actuator to bias the first ratchet member toward the second ratchet member to bring the at least one first ratchet tooth in engagement with the at least one second ratchet tooth using electric power.

With the bicycle hub assembly according to the third aspect, it is possible to change the state of the clutch between the first release state and the second coupling state using electric power.

In accordance with a fourth aspect of the present invention, the bicycle hub assembly according to the third aspect is configured so that the first ratchet member includes iron. The second ratchet member includes iron. The actuator includes a first coil to generate magnetic field to bias the first ratchet member toward the second ratchet member.

With the bicycle hub assembly according to the fourth aspect, it is possible to move the first ratchet member and the second ratchet member to bring the at least one first ratchet tooth into engagement with the at least one second ratchet tooth using a magnetic force produced by the magnetic field.

In accordance with a fifth aspect of the present invention, the bicycle hub assembly according to the fourth aspect is configured so that the actuator includes a second coil to generate magnetic field to bias the first ratchet member toward the second ratchet member.

With the bicycle hub assembly according to the fifth aspect, it is possible to increase the magnetic force produced by the magnetic field, allowing the at least one first ratchet tooth to more strongly come into engagement with the at least one second ratchet tooth in the second coupling state.

In accordance with a sixth aspect of the present invention, the bicycle hub assembly according to the fifth aspect is configured so that the second coil is provided radially inward of the first coil.

With the bicycle hub assembly according to the sixth aspect, it is possible to generate the magnetic field between the first coil and the second coil to produce the magnetic force.

In accordance with a seventh aspect of the present invention, the bicycle hub assembly according to the fifth or sixth aspect is configured so that the first coil is provided radially outward of at least one of the first ratchet member and the second ratchet member. The second coil is provided radially inward of at least one of the first ratchet member and the second ratchet member.

With the bicycle hub assembly according to the seventh aspect, it is possible to effectively transmit the magnetic force to the first ratchet member and the second ratchet member.

In accordance with an eighth aspect of the present invention, the bicycle hub assembly according to any one of the third to seventh aspects is configured so that the actuator includes a shape-memory spring having an axial length which is variable in accordance with the electric power applied to the shape-memory spring.

With the bicycle hub assembly according to the eighth aspect, it is possible to change a biasing force transmitted from the shape-memory spring to the first ratchet member using the electric power.

In accordance with a ninth aspect of the present invention, the bicycle hub assembly according to the eighth aspect is configured so that the shape-memory spring has a first axial length when the electric power is applied to the shape-memory spring. The shape-memory spring has a second axial length when the electric power is not applied to the shape-memory spring. The first axial length is longer than the second axial length.

With the bicycle hub assembly according to the ninth aspect, it is possible to change the biasing force between a force corresponding to the first axial length and a force corresponding to the second axial length. Thus, it is possible to change the state of the clutch between the first release state and the second coupling state by switching length of the shape-memory spring between the first axial length and the second axial length.

In accordance with a tenth aspect of the present invention, the bicycle hub assembly according to the eighth or ninth aspect is configured so that the first ratchet member is provided between the shape-memory spring and the second ratchet member.

With the bicycle hub assembly according to the tenth aspect, it is possible to bias the first ratchet member toward the second ratchet member with the shape-memory spring.

In accordance with an eleventh aspect of the present invention, the bicycle hub assembly according to any one of the eighth to tenth aspects is configured so that the shape-memory spring is provided between the hub shell and the first ratchet member.

With the bicycle hub assembly according to the eleventh aspect, it is possible to utilize a space provided between the hub shell and the first ratchet member for the shape-memory spring.

In accordance with a twelfth aspect of the present invention, the bicycle hub assembly according to any one of the third to eleventh aspects further comprises a clutch controller to control the electric power applied to the clutch.

With the bicycle hub assembly according to the twelfth aspect, it is possible to easily change the state of the clutch between the first release state and the second coupling state via the clutch controller.

In accordance with a thirteenth aspect of the present invention, a bicycle transmission system comprises the bicycle hub assembly according to the first aspect, a bicycle transmission apparatus, and a one-way clutch. The bicycle transmission apparatus couples a bicycle crank to the sprocket support body of the bicycle hub assembly to transmit the pedaling rotational force. The bicycle transmission apparatus has a plurality of speed stages. The one-way clutch is disposed on a transmission path defined between the bicycle crank and the bicycle transmission apparatus.

With the bicycle transmission system according to the thirteenth aspect, the bicycle hub assembly allows the bicycle transmission apparatus to change the speed stage among the plurality of speed stage even during coasting. Accordingly, it is possible to utilize a time period of coasting to change the speed stage.

In accordance with a fourteenth aspect of the present invention, the bicycle transmission system according to the thirteenth aspect further comprises an operation device to generate an operation signal in response to a user input. The bicycle hub assembly includes a clutch controller to control the electric power applied to the clutch in response to the operation signal.

With the bicycle transmission system according to the fourteenth aspect, it is possible to operate the bicycle hub assembly via the operation device.

In accordance with a fifteenth aspect of the present invention, the bicycle transmission system according to the fourteenth aspect is configured so that the bicycle transmission apparatus is operated based on the operation signal.

With the bicycle transmission system according to the fifteenth aspect, it is possible to operate the bicycle transmission apparatus via the operation device in addition to the bicycle hub assembly.

In accordance with a sixteenth aspect of the present invention, the bicycle transmission system according to the fourteenth or fifteenth aspect is configured so that the clutch controller changes a state of the clutch to the second coupling state based on the operation signal when the bicycle crank does not rotate.

With the bicycle transmission system according to the sixteenth aspect, it is possible to change the state of the clutch to the second coupling state by operating the operation device during coasting.

In accordance with a seventeenth aspect of the present invention, the bicycle transmission system according to the sixteenth aspect further comprises a rotational speed sensor to sense a rotational speed of the bicycle crank.

With the bicycle transmission system according to the seventeenth aspect, it is possible to utilize the rotational speed sensed by the rotational speed sensor in order to control the state of the clutch.

In accordance with an eighteenth aspect of the present invention, the bicycle transmission system according to the sixteenth or seventeenth aspect is configured so that the clutch controller controls the clutch to keep the second coupling state in a case where the clutch controller receives the operation signal when the bicycle crank rotates.

With the bicycle transmission system according to the eighteenth aspect, it is possible to keep the second coupling state while the operation signal is received during coasting.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 27 shows an example of gear ratios defined by the first transmission member and the second transmission member of the bicycle transmission apparatus illustrated in FIG. 1.

FIG. 28 shows an example of combinations of a speed stage, a position of the first transmission member, and a position of a guide member in the bicycle transmission apparatus illustrated in FIG. 1.

DESCRIPTION OF THE EMBODIMENTS

Figure 1:
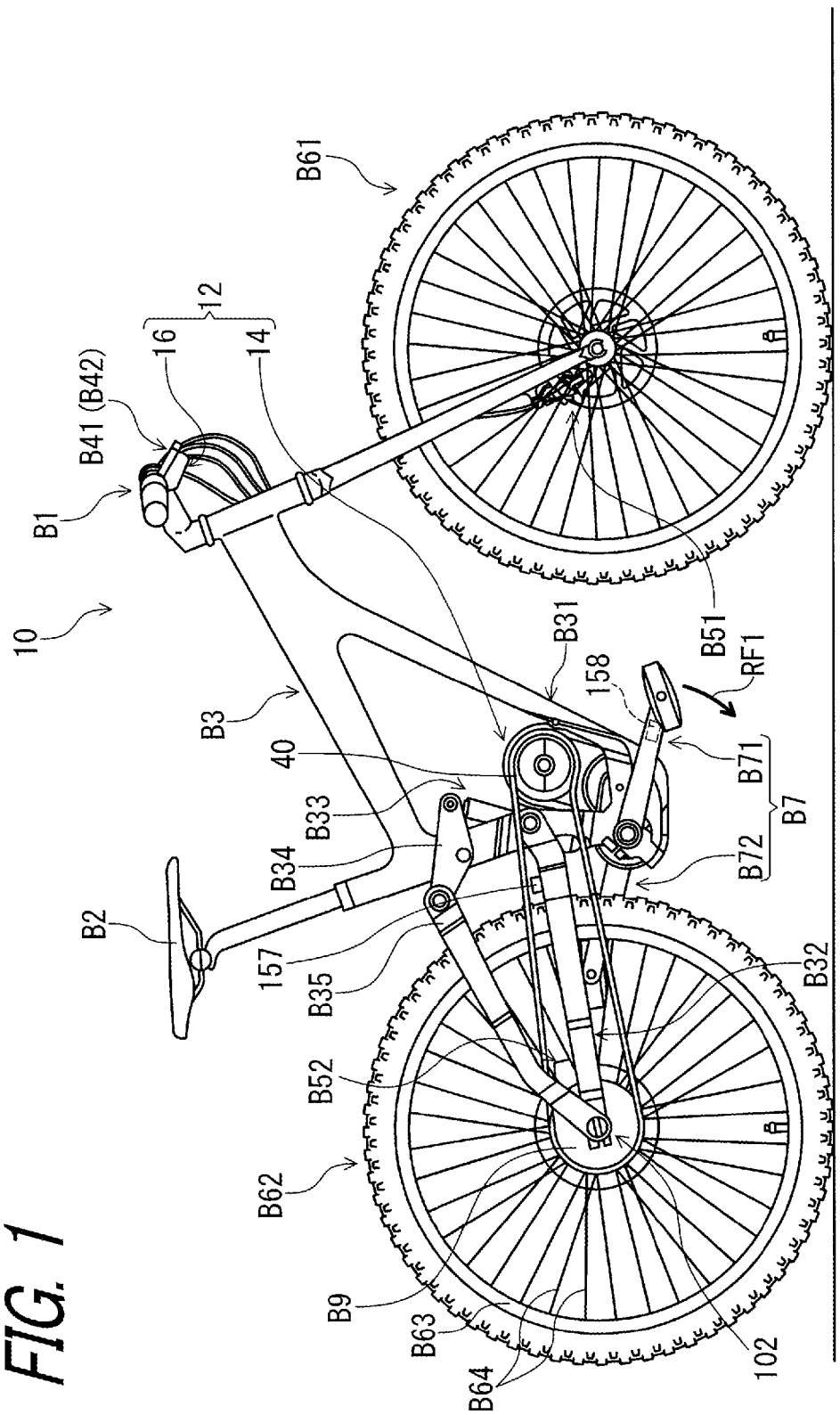
FIG. 1 is a side elevational view of a bicycle provided with a bicycle transmission apparatus in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle 10 equipped with a bicycle transmission system 12 in accordance with a first embodiment is illustrated. While the bicycle 10 is illustrated as a mountain bike, the bicycle transmission system 12 can be applied to road bikes or any type of bicycle.

As seen in FIG. 1, the bicycle 10 includes a handlebar B1, a saddle B2, a bicycle frame B3, a front brake operating device B41, a rear brake operating device B42, a front braking device B51, a rear braking device B52, a front wheel B61, a rear wheel B62, and a bicycle crank B7. The front brake operating device B41 is operatively coupled to the front braking device B51 via an operation cable. The rear brake operating device B42 is operatively coupled to the rear braking device B52 via an operation cable.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle B2 of the bicycle 10 with facing the handlebar B1. Accordingly, these terms, as utilized to describe the bicycle transmission system 12, should be interpreted relative to the bicycle 10 equipped with the bicycle transmission system 12 as used in an upright riding position on a horizontal surface.

The bicycle transmission system 12 comprises a bicycle transmission apparatus 14. The bicycle crank B7 includes crank arms B71 and B72 each coupled to the bicycle transmission apparatus 14 to input a pedaling rotational force RF1 into the bicycle transmission apparatus 14.

The bicycle transmission system 12 further comprises an operation device 16 to generate an operation signal in response to a user input. The bicycle transmission apparatus 14 is operated by the user via the operation device 16 to change a speed stage of the bicycle transmission apparatus 14. The operation device 16 is mounted to the handlebar B1 and is adjacent to the front brake operating device B41, for example. The operation device 16 can be integrated in at least one of the front brake operating device B41 and the rear brake operating device B42 if needed and/or desired.

The operation device 16 is operatively coupled to the bicycle transmission apparatus 14. In this embodiment, the operation device 16 is wirelessly connected to the bicycle transmission apparatus 14. The bicycle transmission apparatus 14 is wirelessly actuated in response to a shift operation of the operation device 16. However, the operation device 16 can be mechanically coupled to the bicycle transmission apparatus 14 if needed and/or desired. Furthermore, the operation device 16 can be electrically connected to the bicycle transmission apparatus 14 via an electric operation cable.

As seen in FIG. 1, the bicycle transmission apparatus 14 is mounted to the bicycle frame B3. The bicycle transmission apparatus 14 transmits the pedaling rotational force RF1 to the rear wheel B62 at a variable speed stage. The bicycle transmission apparatus 14 has a plurality of speed stages. In this embodiment, the variable speed stage includes the speed stages different from each other. While the bicycle transmission apparatus 14 has thirteen speed stages in this embodiment, the bicycle transmission apparatus 14 can have at least two speed stages. Furthermore, the bicycle transmission apparatus 14 can have a continuously variable speed stage if needed and/or desired.

Figure 2:
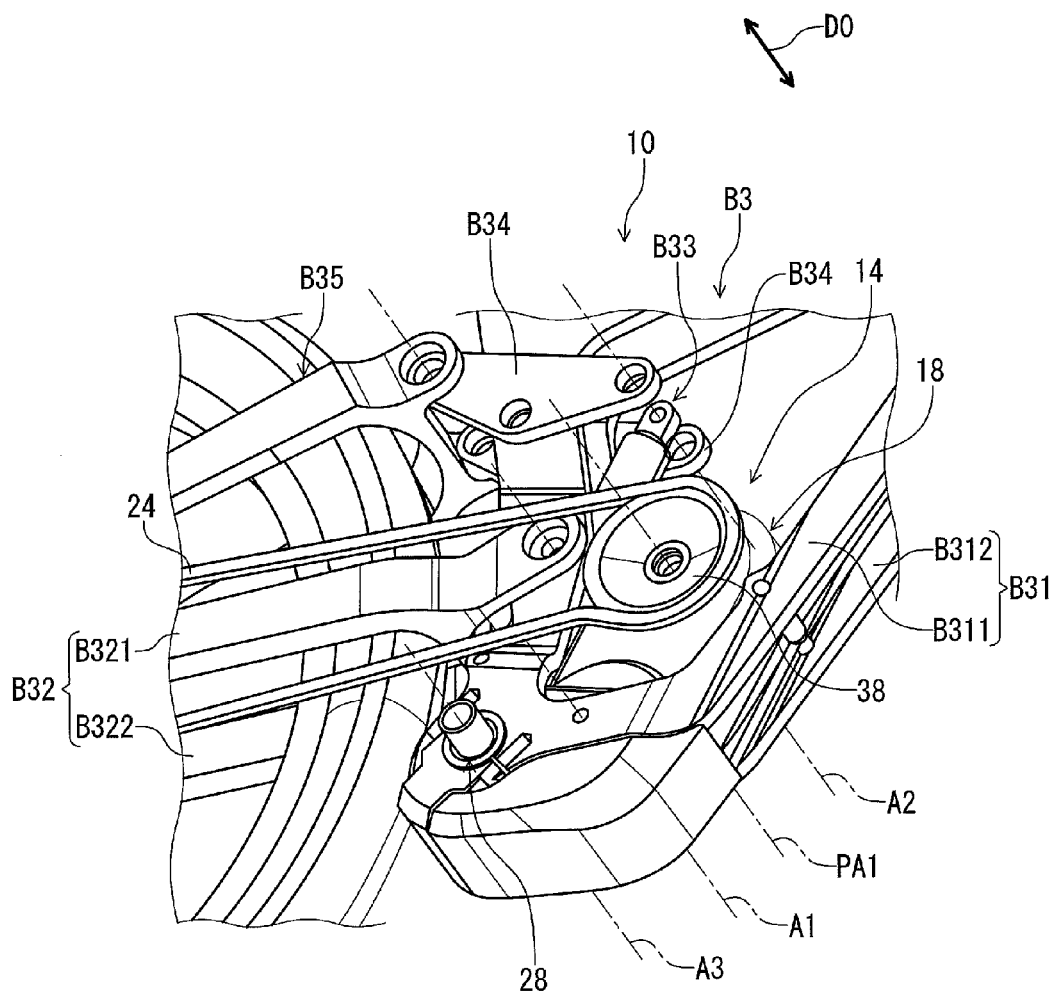
FIG. 2 is a perspective view of the bicycle transmission apparatus mounted to a bicycle frame of the bicycle illustrated in FIG. 1.
Figure 3:
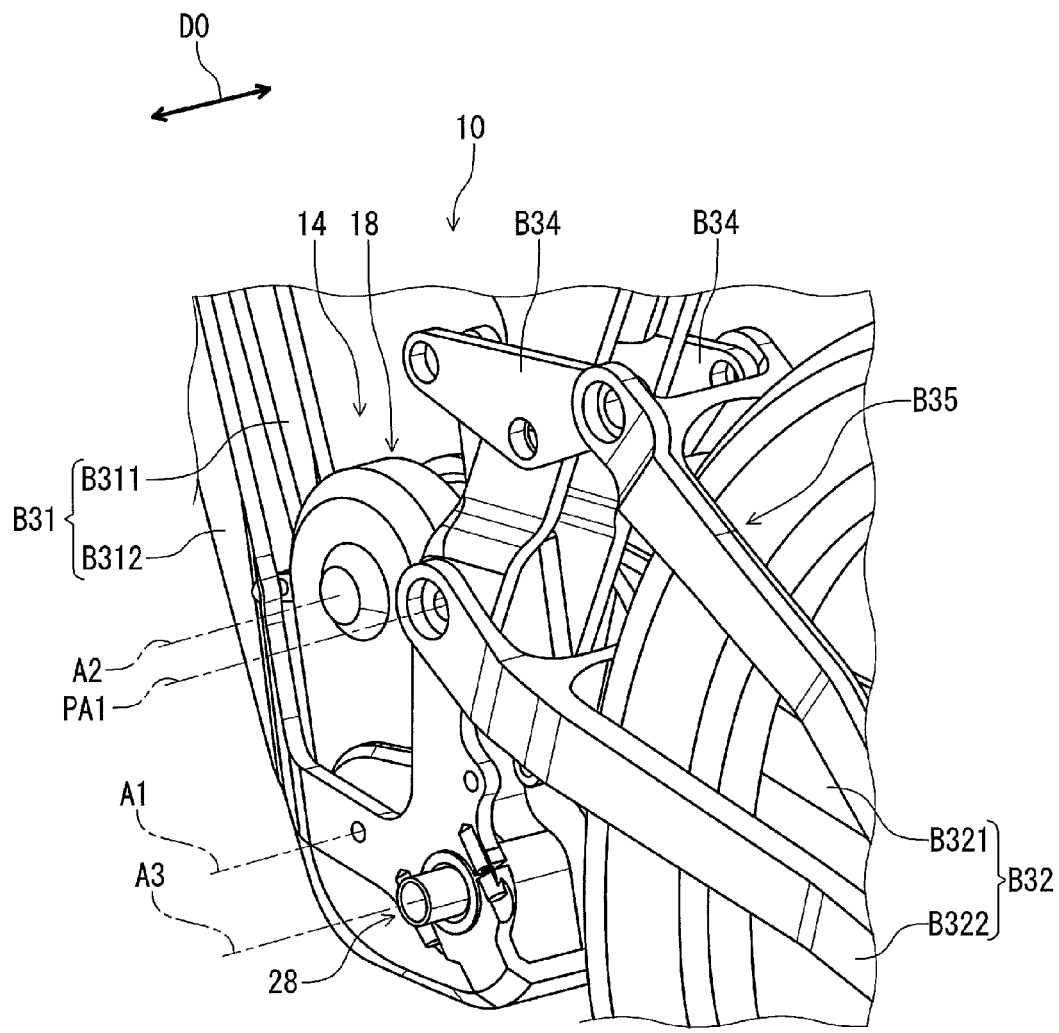
FIG. 3 is a perspective view of the bicycle transmission apparatus mounted to the bicycle frame of the bicycle illustrated in FIG. 1.

As seen in FIGS. 2 and 3, the bicycle transmission apparatus 14 comprises a base member 18. The base member 18 is mounted to the bicycle frame B3 and serves as a housing of the bicycle transmission apparatus 14. In this embodiment, the base member 18 is attached to the bicycle frame B3 as a separate member from the bicycle frame B3. However, at least part of the base member 18 can be integrally provided with the bicycle frame B3 as a single unitary member if needed and/or desired.

In this embodiment, the bicycle frame B3 includes a first frame B31 and a second frame B32. The base member 18 is mounted to the first frame B31 as a separate member from the first frame B31. The second frame B32 is pivotably coupled to the first frame B31 about a pivot axis PA1. The first frame B31 includes first sub frames B311 and B312 spaced apart from each other in a transverse direction D0 of the bicycle 10. The pivot axis PA1 is parallel to the transverse direction D0. The base member 18 is provided between the first sub frames B311 and B312.

The second frame B32 includes second sub frames B321 and B322 spaced apart from each other in the transverse direction D0. The second sub frame B321 is coupled to the second sub frame B322 as a one-piece unitary member. The second sub frame B321 is pivotably coupled to the first sub frame B311 about the pivot axis PA1. The second sub frame B322 is pivotably coupled to the first sub frame B312 about the pivot axis PA1.

As seen in FIG. 1, the bicycle frame B3 further includes a suspension device B33, a first link B34, and a second link B35. The first link B34 is pivotably coupled to the first frame B31. The second link B35 is rotatably coupled to the rear wheel B62 and one end of the first link B34. The second link B35 is rigidly coupled to the second sub frames B321 and B322. The second link B35 and the second sub frames B321 and B322 may be integrally provided as a one-piece unitary member. The suspension device B33 is pivotably coupled to the first frame B31 and the other end of the first link B34 for absorbing shock applied to the bicycle frame B3.

Figure 4:
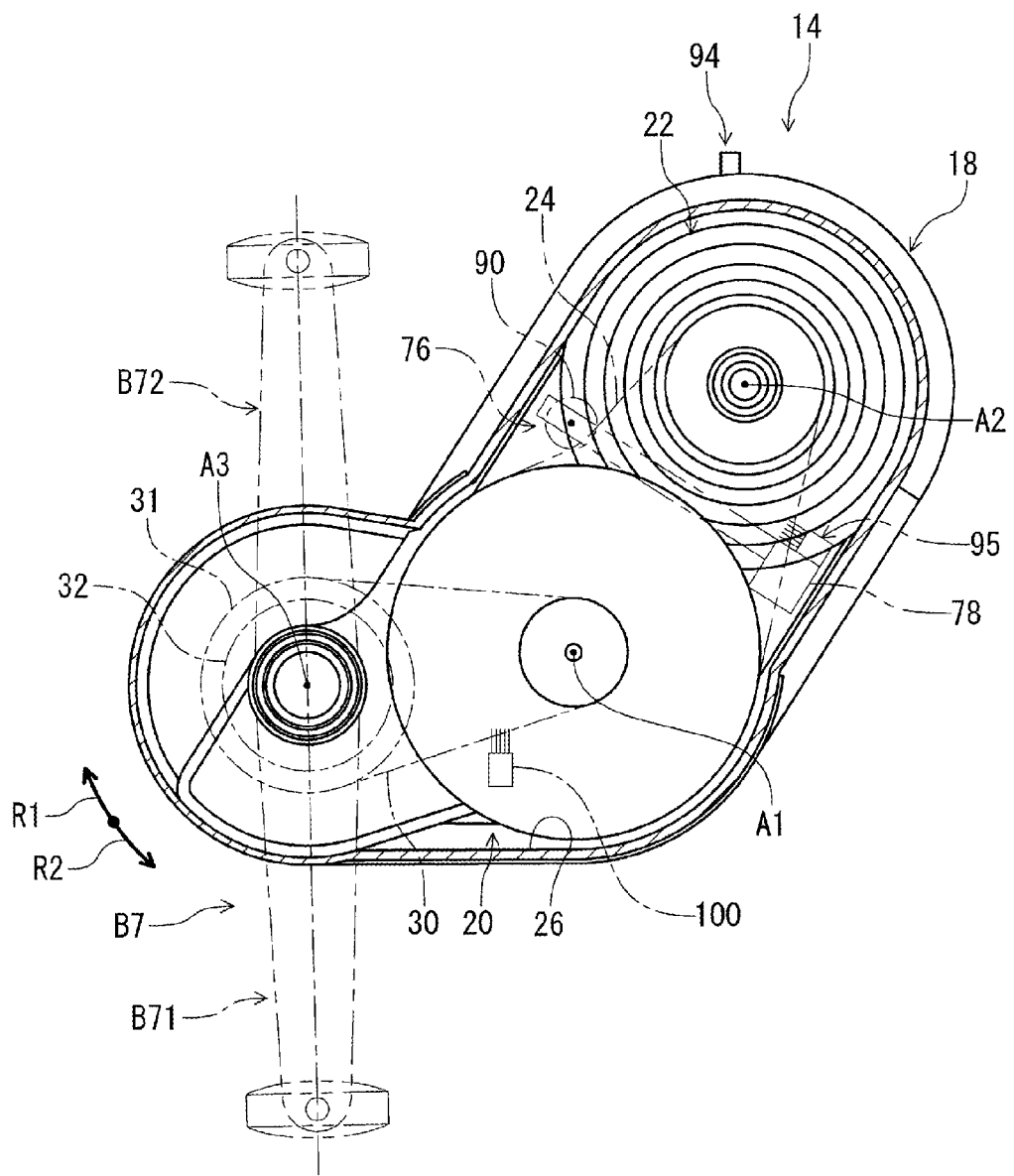
FIG. 4 is a cross-sectional view of the bicycle transmission apparatus illustrated in FIG. 1.

As seen in FIG. 4, the bicycle transmission apparatus 14 comprises a first transmission member 20, a second transmission member 22, and a first coupling member 24. The base member 18 includes an internal space 26 in which the first transmission member 20 and the second transmission member 22 are provided. The first transmission member 20 is provided in the internal space 26 of the base member 18. The second transmission member 22 is provided in the internal space 26 of the base member 18.

The first transmission member 20 is rotatable relative to the base member 18 about a first rotational axis A1. The second transmission member 22 is rotatable relative to the base member 18 about a second rotational axis A2.

As seen in FIG. 4, the first coupling member 24 couples the first transmission member 20 to the second transmission member 22 to transmit rotation of the first transmission member 20 to the second transmission member 22 at a variable speed stage. The first coupling member 24 provides a closed loop to surround the first rotational axis A1 and the second rotational axis A2 when viewed from a transmission axial direction D1 (FIG. 5) parallel to the first rotational axis A1. In this embodiment, the first coupling member 24 comprises a bicycle chain to engage with the first transmission member 20 and the second transmission member 22. However, the first coupling member 24 can comprise a coupling member such as a coupling belt.

Figure 5:
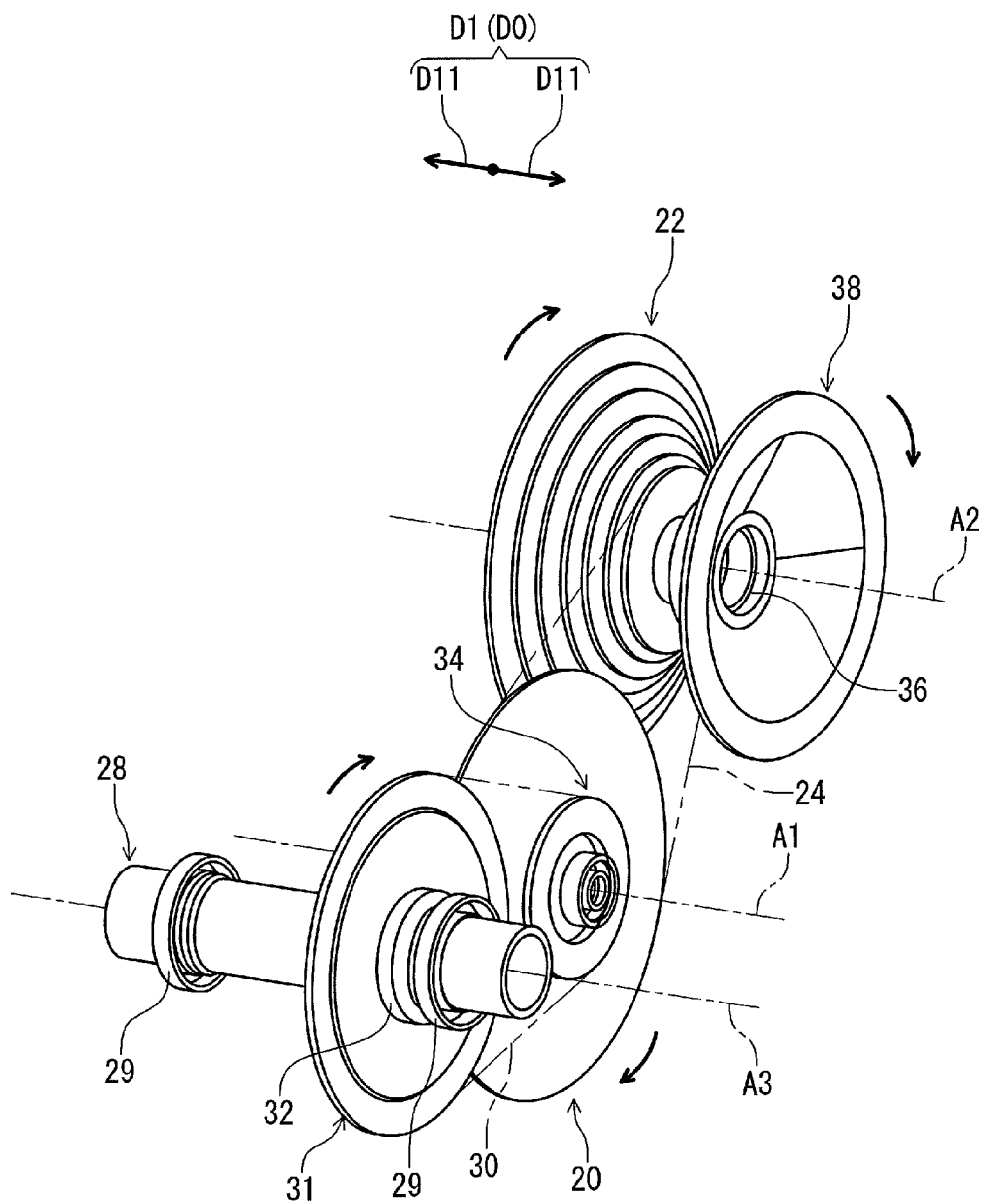
FIG. 5 is a perspective view of the bicycle transmission apparatus illustrated in FIG. 1 without a base member.

As seen in FIG. 5, the second rotational axis A2 is parallel to the first rotational axis A1 in this embodiment. However, the second rotational axis A2 can be non-parallel to the first rotational axis A1 if needed and/or desired. The first rotational axis A1 and the second rotational axis A2 are parallel to the transverse direction D0 of the bicycle 10.

Figure 6:
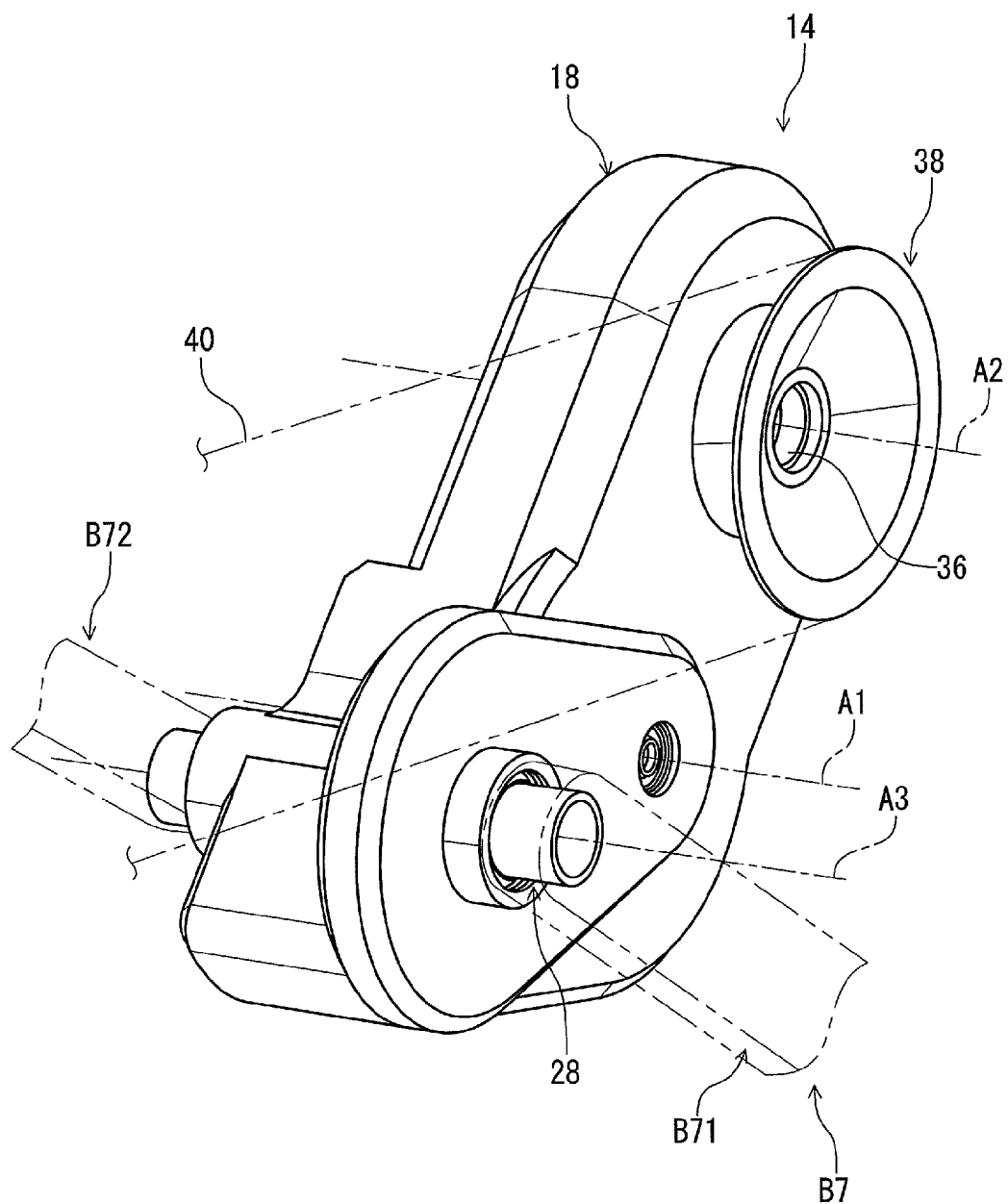
FIG. 6 is a perspective view of the bicycle transmission apparatus illustrated in FIG. 1.
Figure 7:
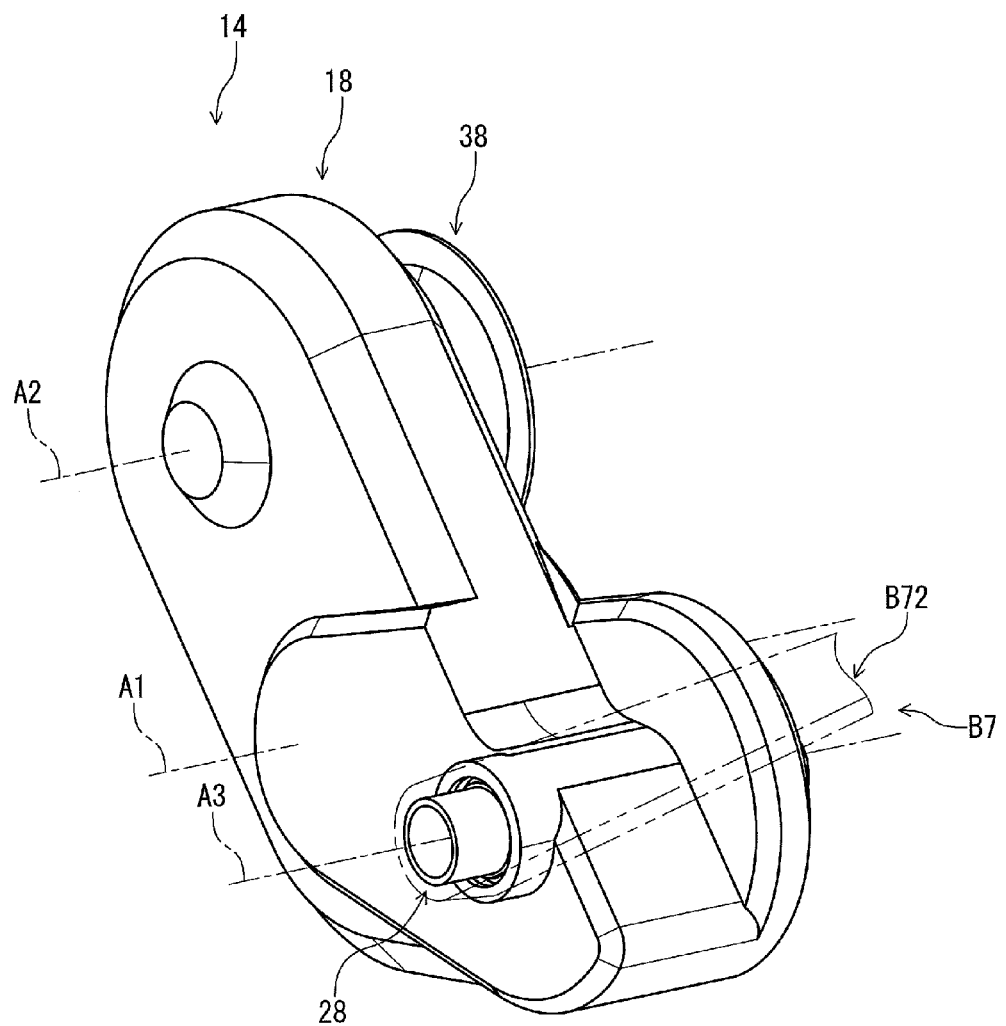
FIG. 7 is a perspective view of the bicycle transmission apparatus illustrated in FIG. 1.

As seen in FIGS. 5 and 6, the bicycle transmission apparatus 14 further comprises an input shaft 28. The input shaft 28 is rotatably mounted to the base member 18 (FIG. 6) to receive an input torque. The input shaft 28 is rotatable relative to the base member 18 (FIG. 6) about an input rotational axis A3 in response to the input torque. The bicycle transmission apparatus 14 further comprises input bearing assemblies 29. The input shaft 28 is rotatably mounted to the base member 18 (FIG. 6) via the input bearing assemblies 29 (FIG. 5). As seen in FIGS. 6 and 7, the input shaft 28 is coupled to the crank arms B71 and B72 of the bicycle crank B7 as the crank axle of the bicycle crank B7.

As seen in FIG. 5, the bicycle transmission apparatus 14 further comprises an input coupling member 30. The input coupling member 30 couples the input shaft 28 to the first transmission member 20 to transmit rotation of the input shaft 28 to the first transmission member 20. The first transmission member 20 is coupled to the input shaft 28 via the input coupling member 30 to rotate with the input shaft 28 relative to the base member 18.

As seen in FIG. 4, the input coupling member 30 provides a closed loop to surround the input rotational axis A3 and the first rotational axis A1 when viewed from the transmission axial direction D1. The input coupling member 30 is provided in the internal space 26 of the base member 18. In this embodiment, the input coupling member 30 comprises a bicycle chain to couple the input shaft 28 to the first transmission member 20. However, the input coupling member 30 can comprise a coupling member such as a coupling belt.

As seen in FIG. 5, the bicycle transmission apparatus 14 further comprises an input cogwheel 31. The input cogwheel 31 is coupled to the input shaft 28 to rotate together with the input shaft 28 relative to the base member 18 about the input rotational axis A3. The input coupling member 30 is engaged with the input cogwheel 31.

As seen in FIG. 4, the bicycle transmission system 12 comprises a one-way clutch 32. The one-way clutch 32 is disposed on a transmission path defined between the bicycle crank B7 and the bicycle transmission apparatus 14. In this embodiment, the one-way clutch 32 is provided in the bicycle transmission apparatus 14. The one-way clutch 32 transmits a first rotation R1 of the input shaft 28 to the first transmission member 20 and prevents a second rotation R2 of the input shaft 28 from being transmitted from the input shaft 28 to the first transmission member 20. The second rotation R2 is opposite to the first rotation R1 about the input rotational axis A3.

Figure 8:
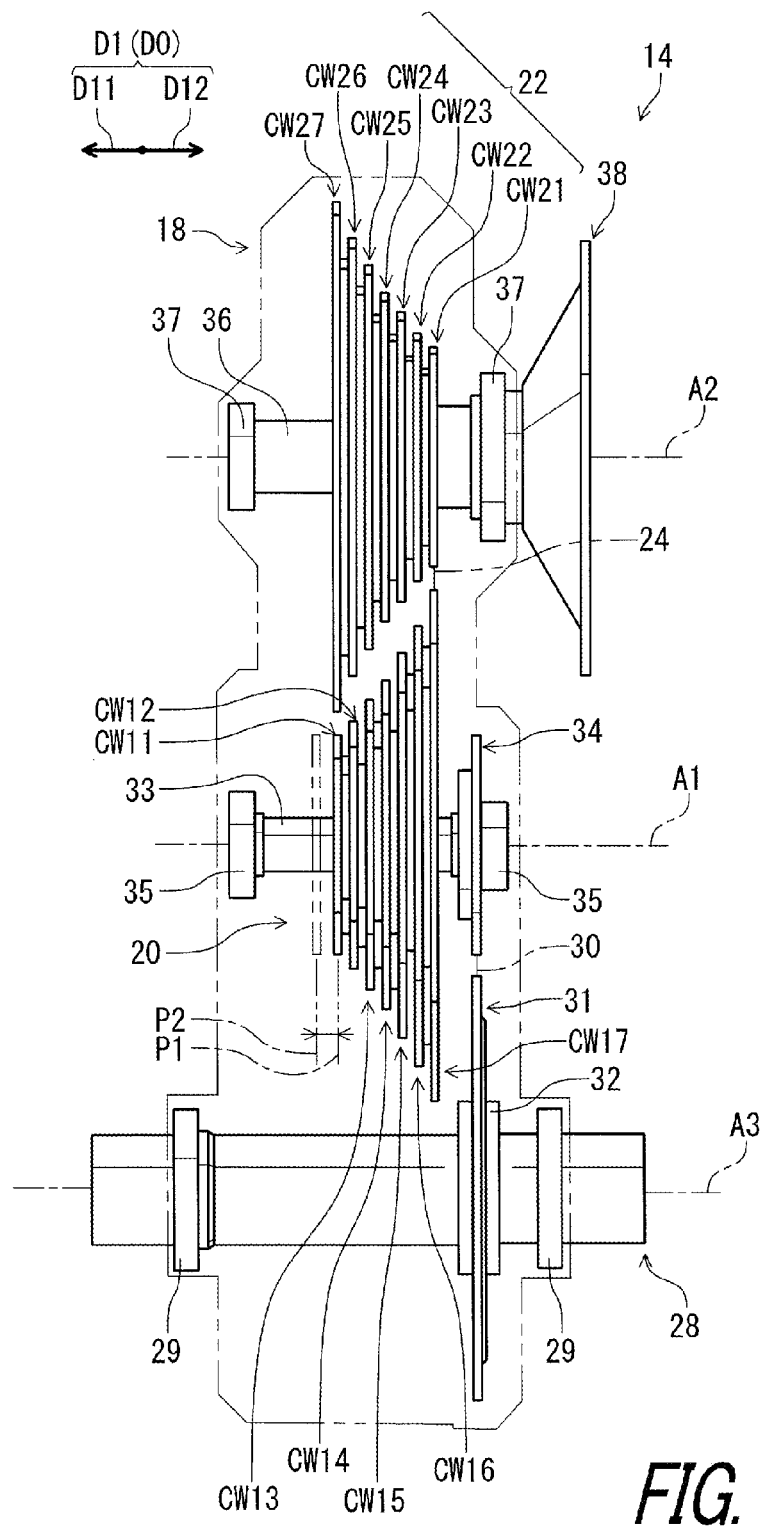
FIG. 8 is a plan view of the bicycle transmission apparatus illustrated in FIG. 1 without the base member when viewed diagonally backward.

As seen in FIG. 8, the one-way clutch 32 couples the input cogwheel 31 to the input shaft 28 and is provided between the input shaft 28 and the input cogwheel 31. As seen in FIG. 4, the one-way clutch 32 transmits the first rotation R1 of the input shaft 28 to the input cogwheel 31 and prevents the second rotation R2 of the input shaft 28 from being transmitted from the input shaft 28 to the input cogwheel 31. The one-way clutch 32 can be omitted from the bicycle transmission apparatus 14 if needed and/or desired.

As seen in FIG. 8, the bicycle transmission apparatus 14 further comprises a first shaft 33 and an intermediate cogwheel 34. The first shaft 33 defines the first rotational axis A1. The first transmission member 20 is rotatable relative to the first shaft 33 about the first rotational axis A1. The intermediate cogwheel 34 is rotatable relative to the first shaft 33 about the first rotational axis A1. The intermediate cogwheel 34 is coupled to the first transmission member 20 to rotate together with the first transmission member 20 relative to the base member 18 about the first rotational axis A1. The bicycle transmission apparatus 14 further comprises first bearing assemblies 35. The first shaft 33 is rotatably mounted to the base member 18 about the first rotational axis A1 via the first bearing assemblies 35.

As seen in FIG. 5, the input coupling member 30 is engaged with the intermediate cogwheel 34. The intermediate cogwheel 34 is coupled to the input cogwheel 31 via the input coupling member 30. The input coupling member 30 couples the input cogwheel 31 to the intermediate cogwheel 34 to transmit rotation of the input shaft 28 to the first transmission member 20. The input cogwheel 31 comprises a sprocket including teeth. The intermediate cogwheel 34 comprises a sprocket including teeth. The input shaft 28 is coupled to the first transmission member 20 via the input cogwheel 31, the input coupling member 30, and the intermediate cogwheel 34 to rotate with the first transmission member 20 relative to the base member 18.

As seen in FIG. 8, the bicycle transmission apparatus 14 further comprises an output shaft 36. The output shaft 36 is rotatable relative to the base member 18 about the second rotational axis A2. The second transmission member 22 is coupled to the output shaft 36 to rotate together with the output shaft 36 relative to the base member 18 about the second rotational axis A2. The bicycle transmission apparatus 14 further comprises output bearing assemblies 37. The output shaft 36 is rotatably mounted to the base member 18 via the output bearing assemblies 37.

The bicycle transmission apparatus 14 further comprises an output cogwheel 38. The output cogwheel 38 is coupled to the output shaft 36 to rotate together with the output shaft 36 relative to the base member 18 about the second rotational axis A2. Namely, the second transmission member 22, the output shaft 36, and the output cogwheel 38 are rotatable integrally with each other relative to the base member 18 about the second rotational axis A2. The output cogwheel 38 comprises a sprocket including teeth. The pedaling rotational force RF1 is transmitted from the input shaft 28 to the output cogwheel 38 via the input cogwheel 31, the input coupling member 30, the intermediate cogwheel 34, the first transmission member 20, the first coupling member 24, the second transmission member 22, and the output shaft 36. As seen in FIGS. 1 and 6, an output coupling member 40 such as a bicycle chain is engaged with the output cogwheel 38 and a rear sprocket B9 (FIG. 1) of the bicycle 10.

As seen in FIG. 8, the first transmission member 20 is movable relative to the base member 18 in the transmission axial direction D1 parallel to the first rotational axis A1. The second transmission member 22 is stationary relative to the base member 18 in the transmission axial direction D1. In this embodiment, the first transmission member 20 is movable relative to the base member 18 and the second transmission member 22 between a first axial position P1 and a second axial position P2 in the transmission axial direction D1.

The variable speed stage of the bicycle transmission apparatus 14 is variable in accordance with at least one positional relationship among the first transmission member 20, the second transmission member 22, and the first coupling member 24 in the transmission axial direction D1. The transmission axial direction D1 includes a first transmission axial direction D11 and a second transmission axial direction D12 opposite to the first transmission axial direction D11.

The first transmission member 20 includes first cogwheels CW11 to CW17 arranged in the transmission axial direction D1. Each of the first cogwheels CW11 to CW17 is engageable with the first coupling member 24. The first cogwheels CW11 to CW17 respectively define the speed stages together with the second cogwheels CW21 to CW27. The second transmission member 22 includes second cogwheels CW21 to CW27 arranged in the transmission axial direction D1. Each of the second cogwheels CW21 to CW27 is engageable with the first coupling member 24. The second cogwheels CW21 to CW27 respectively define the speed stages together with the first cogwheels CW11 to CW17.

As seen in FIG. 8, a total number of the first cogwheels CW11 to CW17 is equal to a total number of the second cogwheels CW21 to CW27. In this embodiment, the first transmission member 20 includes seven first cogwheels CW11 to CW17 arranged in the transmission axial direction D1. The second transmission member 22 includes seven second cogwheels CW21 to CW27 arranged in the transmission axial direction D1. A total number of the first cogwheels can be different from a total number of the second cogwheels if needed and/or desired.

In this embodiment, the first cogwheels CW11 to CW17 are spaced apart from each other in the transmission axial direction D1 at a regular interval. The second cogwheels CW21 to CW27 are spaced apart from each other in the transmission axial direction D1 at a regular interval equal to the regular interval of the first cogwheels CW11 to CW17.

The first cogwheel CW11 is disposed at an axial position substantially equal to an axial position of the second cogwheel CW27 in a first state where the first transmission member 20 is positioned at the first axial position P1. The first cogwheel CW12 is disposed at an axial position substantially equal to the axial position of the second cogwheel CW27 in a second state where the first transmission member 20 is positioned at the second axial position P2. The first cogwheels CW11 to CW17 are respectively disposed at axial positions equal to axial positions of the second cogwheels CW27 to CW21 in the first state of the first transmission member 20. The first cogwheels CW12 to CW 17 are respectively disposed at axial positions equal to axial positions of the second cogwheels CW27 to CW22 in the second state of the first transmission member 20.

Figure 9:
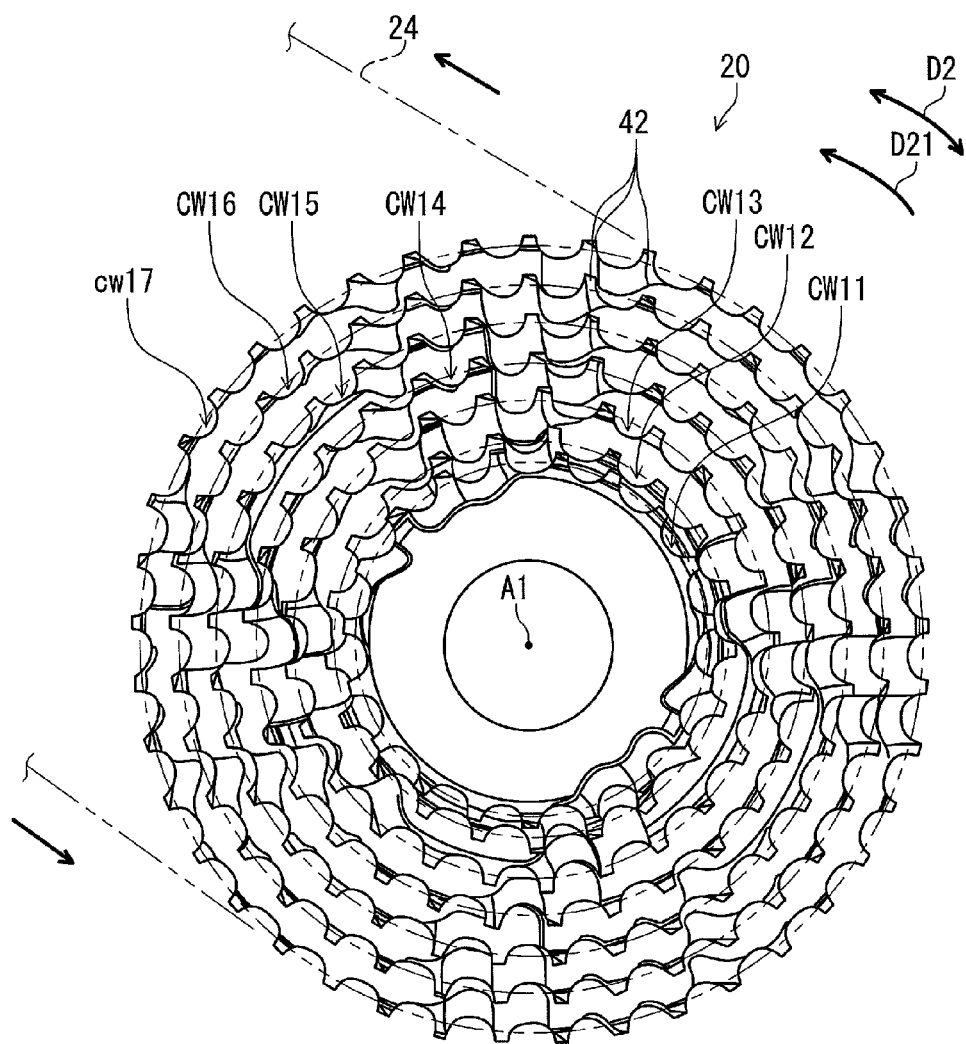
FIG. 9 is a side elevational view of a first transmission member of the bicycle transmission apparatus illustrated in FIG. 1.

As seen in FIG. 9, the first cogwheels CW11 to CW17 include a first largest cogwheel CW17 and a first smallest cogwheel CW11. The first smallest cogwheel CW11 has an outer diameter smaller than an outer diameter of the first largest cogwheel CW17. As seen in FIG. 8, the first smallest cogwheel CW11 is spaced apart from the first largest cogwheel CW17 in the first transmission axial direction D11.

Figure 10:
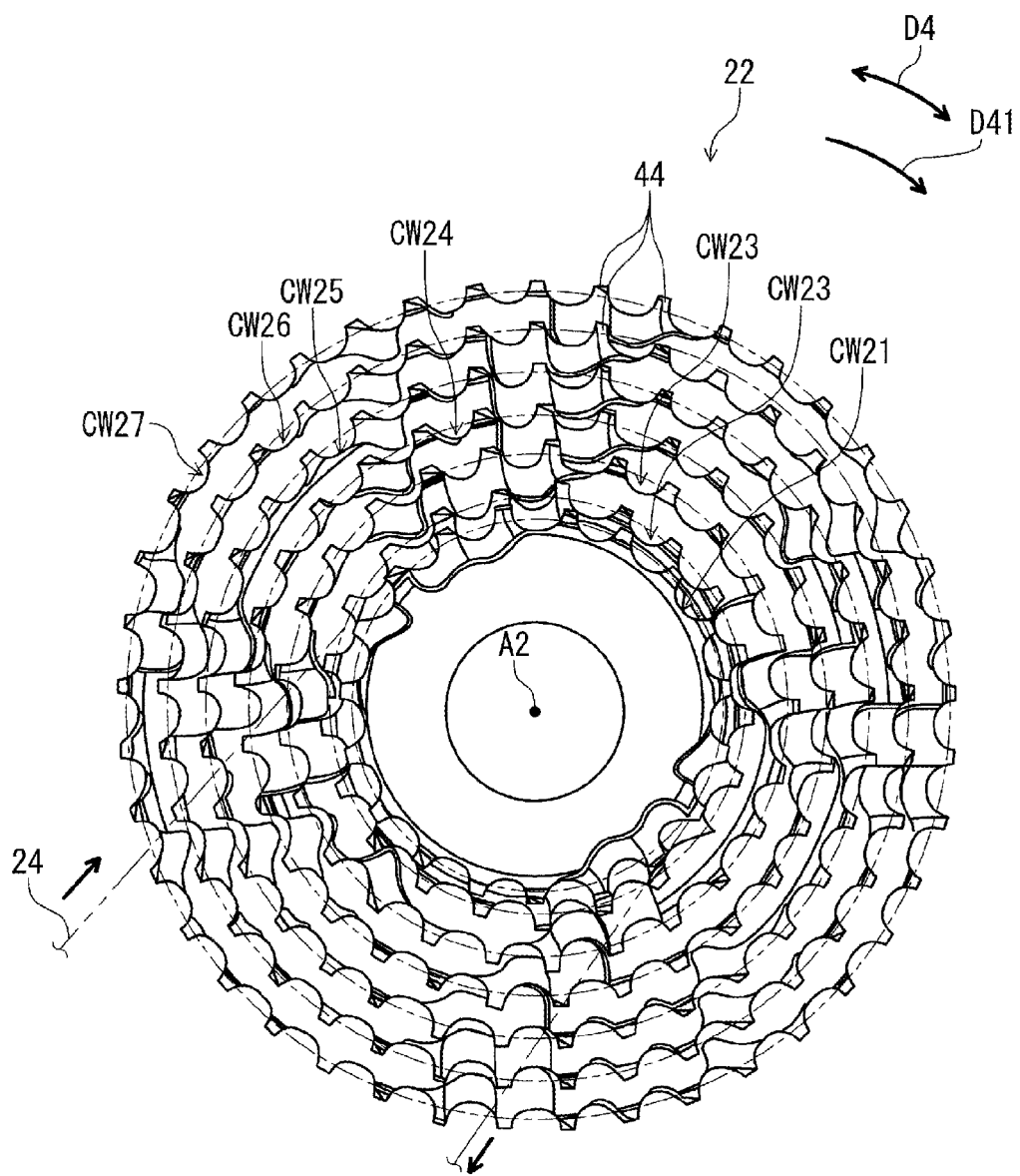
FIG. 10 is a side elevational view of a second transmission member of the bicycle transmission apparatus illustrated in FIG. 1.

As seen in FIG. 10, the second cogwheels CW21 to CW27 include a second largest cogwheel CW27 and a second smallest cogwheel CW21. The second smallest cogwheel CW21 has an outer diameter smaller than an outer diameter of the second largest cogwheel CW27. As seen in FIG. 8, the second smallest cogwheel CW21 is spaced apart from the second largest cogwheel CW27 in the second transmission axial direction D12.

As seen in FIG. 9, each of the first cogwheels CW11 to CW17 includes first teeth 42 arranged in a circumferential direction D2 of the first transmission member 20. The first cogwheels CW11 to CW17 respectively have first pitch circles each defined by the first teeth 42. The first transmission member 20 rotates about the first rotational axis A1 in a driving rotational direction D21 during pedaling.

As seen in FIG. 10, each of the second cogwheels CW21 to CW27 includes second teeth 44 arranged in a circumferential direction D4 of the second transmission member 22. The second cogwheels CW21 to CW27 respectively have second pitch circles each defined by the second teeth 44. The second transmission member 22 rotates about the second rotational axis A2 in a driving rotational direction D41 during pedaling.

Figure 11:
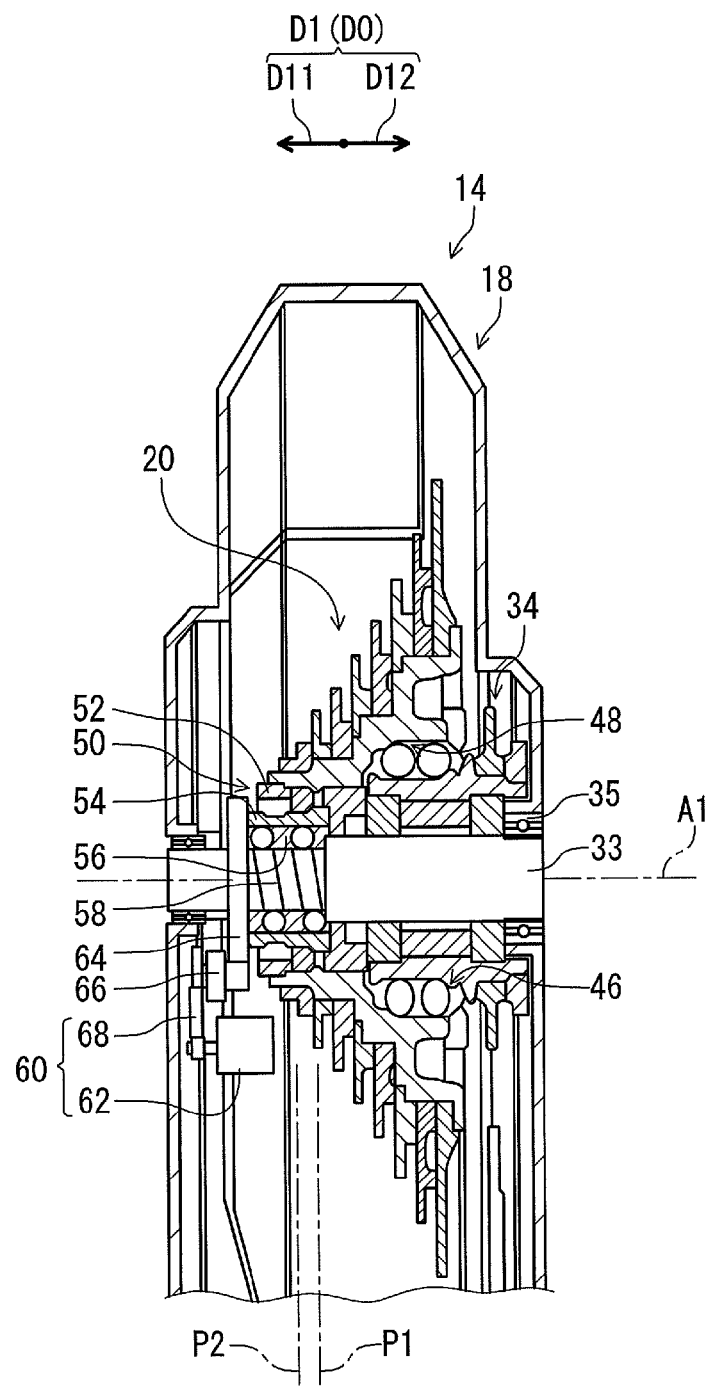
FIG. 11 is a cross-sectional view of the bicycle transmission apparatus illustrated in FIG. 1.

As seen in FIG. 11, the bicycle transmission apparatus 14 further comprises a bearing structure 46. The bearing structure 46 rotatably couples the first transmission member 20 to the first shaft 33 about the first rotational axis A1. The first transmission member 20 has a first opening 48. The first shaft 33 extends through the first opening 48. The bearing structure 46 is provided in the first opening 48.

The first shaft 33 is rotatable relative to the base member 18. The first shaft 33 is restricted from moving relative to the base member 18 in the transmission axial direction D1. The bearing structure 46 movably couples the first transmission member 20 to the first shaft 33 in the transmission axial direction D1. Namely, the first transmission member 20 is rotatable relative to the base member 18 and the first shaft 33 and is movable relative to the base member 18 and the first shaft 33 in the transmission axial direction D1. Unlike the first transmission member 20, the intermediate cogwheel 34 is stationary relative to the base member 18 in the transmission axial direction D1.

As seen in FIG. 11, the bicycle transmission apparatus 14 further comprises a positioning device 50 to position the first transmission member 20 relative to the base member 18 in the transmission axial direction D1 at each of axial positions. The positioning device 50 positions the first transmission member 20 relative to the base member 18 in the transmission axial direction D1 at each of the first axial position P1 and the second axial position P2. The first transmission member 20 is movable relative to the base member 18 in the first transmission axial direction D11 from the first axial position P1 to the second axial position P2. The first transmission member 20 is movable relative to the base member 18 in the second transmission axial direction D12 from the second axial position P2 to the first axial position P1.

In this embodiment, the positioning device 50 includes a holder 52, rolling elements 54, and a retainer 56. The holder 52 is rotatable relative to the first transmission member 20 and the first shaft 33 about the first rotational axis A1. The holder 52 is movable integrally with the first transmission member 20 relative to the base member 18 and the first shaft 33 in the transmission axial direction D1. The holder 52 has a tubular shape. The rolling elements 54 and the retainer 56 are provided in the holder 52. The retainer 56 rotatably holds the rolling elements 54 and is attached to the holder 52 to move integrally with the holder 52 in the transmission axial direction D1.

The first shaft 33 includes a guide groove 58 to guide the rolling elements 54 in the transmission axial direction D1. The guide groove 58 is provided on an outer peripheral surface of the first shaft 33 in a spiral manner. The rolling elements 54 are provided in the guide groove 58 and are arranged around the first shaft 33 along the guide groove 58. The holder 52, the rolling elements 54, the retainer 56, and the guide groove 58 constitute a ball screw to convert rotation of the first shaft 33 into linear motion of the first transmission member 20. Rotation of the first shaft 33 relative to the base member 18 moves the holder 52, the rolling elements 54, and the retainer 56 relative to the first shaft 33 and the base member 18 in the transmission axial direction D1. This moves the first transmission member 20 relative to the base member 18 in the transmission axial direction D1.

The bicycle transmission apparatus 14 further comprises a switching device 60 to switch a position of the first transmission member 20 relative to the base member 18 in the transmission axial direction D1 between the first axial position P1 and the second axial position P2.

In this embodiment, the switching device 60 includes a switching actuator 62, a driven gear 64, a reduction structure 66, and a reverse-input prevention element 68. The switching actuator 62, the driven gear 64, the reduction structure 66, and the reverse-input prevention element 68 are provided in the base member 18 and are mounted to the base member 18. The reduction structure 66 includes some gears to decelerate an input rotation from the switching actuator 62 and to output decelerated rotation to the driven gear 64. The switching actuator 62 generates an actuating force to move the first transmission member 20 relative to the base member 18 in the transmission axial direction D1. While the switching actuator 62 is a stepper motor in this embodiment, the switching actuator 62 can be a direct-current (DC) motor or other type of actuators if needed and/or desired. The driven gear 64 is coupled to the first shaft 33 to rotate integrally with the first shaft 33 about the first rotational axis A1. An output gear of the reduction structure 66 meshes with the driven gear 64 to transmit rotation to the driven gear 64 relative to the base member 18 about the first rotational axis A1 at a specific gear ratio. The reduction structure 66 is a reduction gear, for example.

The reverse-input prevention element 68 transmits the actuating force from the switching actuator 62 to the reduction structure 66. Specifically, the reverse-input prevention element 68 transmits rotation from the switching actuator 62 to the reduction structure 66 in both rotational directions. On the other hand, the reverse-input prevention element 68 prevents rotation of the reduction structure 66 from being transmitted from the reduction structure 66 to the switching actuator 62. The reverse-input prevention element 68 can be omitted from the switching device 60 if needed and/or desired.

Other structures can be applied to the switching device 60. For example, it is possible to directly move the first transmission member 20 relative to the base member 18 using structures such as gears or cams if needed and/or desired.

Figure 12:
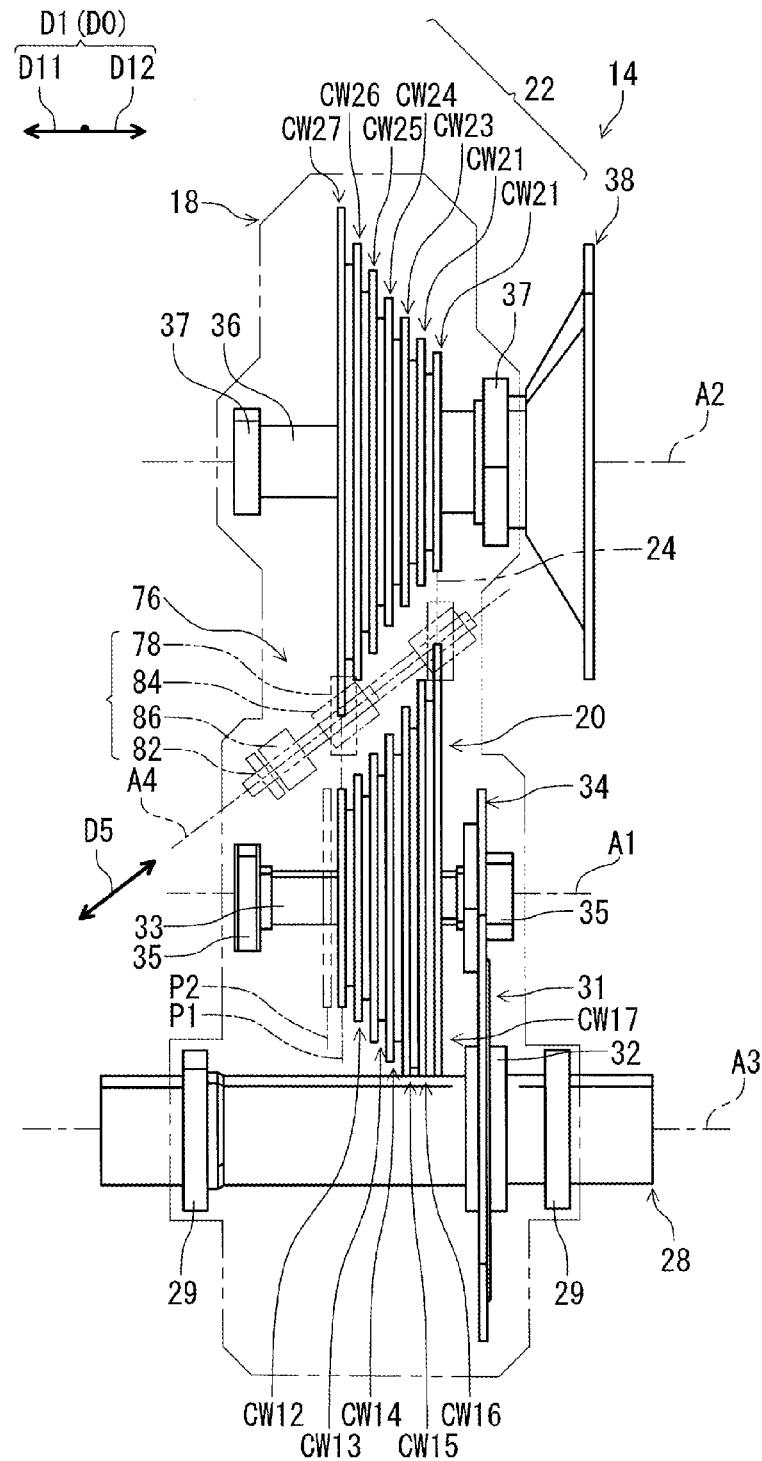
FIG. 12 is another plan view of the bicycle transmission apparatus illustrated in FIG. 1 without the base member when viewed diagonally backward.
Figure 13:
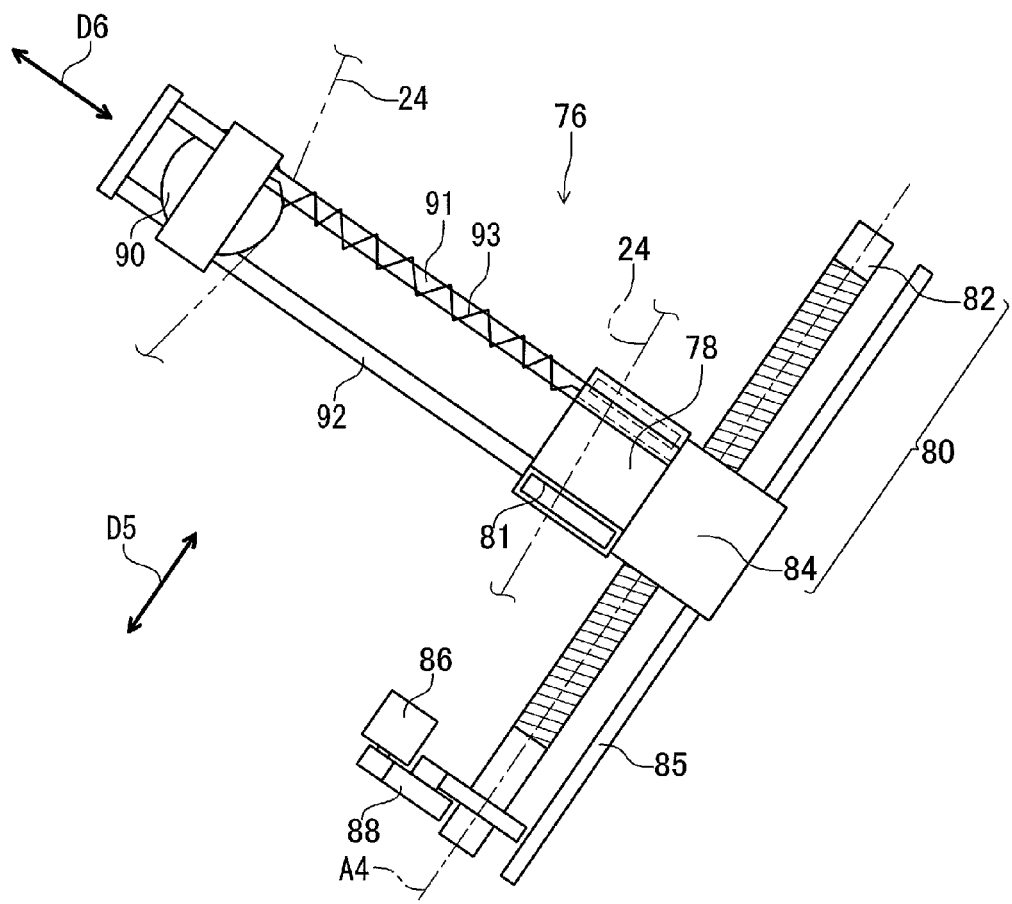
FIG. 13 is an elevational view of a guide device of the bicycle transmission apparatus illustrated in FIG. 1.

As seen in FIGS. 12 and 13, the bicycle transmission apparatus 14 further comprises a guide device 76. The guide device 76 guides the first coupling member 24 to change at least one of a first relative position between the first coupling member 24 and the first transmission member 20, and a second relative position between the first coupling member 24 and the second transmission member 22.

The guide device 76 includes a guide member 78 and a guide unit 80. The guide member 78 is contactable with the first coupling member 24. The guide unit 80 guides the guide member 78 in a first guide direction D5 to change at least one of the first relative position and the second relative position. The guide unit 80 is provided in the base member 18 and are mounted to the base member 18. In this embodiment, the first guide direction D5 is not parallel to the transmission axial direction D1. However, the first guide direction D5 can be parallel to the transmission axial direction D1 if needed and/or desired.

As seen in FIG. 13, the guide member 78 includes a guide opening 81 through which the first coupling member 24 extends. The guide member 78 is slidable with the first coupling member 24 to move (shift) the first coupling member 24 in the first guide direction D5.

As seen in FIGS. 12 and 13, the guide unit 80 includes a guide shaft 82 and a coupling structure 84. The guide shaft 82 is rotatable relative to the base member 18 about a guide rotational axis A4 parallel to the first guide direction D5. The guide shaft 82 is rotatably mounted to the base member 18 via bearing units (not shown). The coupling structure 84 rotatably couples the guide shaft 82 to the guide member 78. The guide shaft 82 and the coupling structure 84 constitute a ball screw to convert rotation of the guide shaft 82 into a linear motion of the guide member 78.

As seen in FIG. 13, the guide unit 80 further includes a sub shaft 85 extending along the guide shaft 82 in the first guide direction D5. The sub shaft 85 extends through a hole (not shown) of the coupling structure 84 to prevent the coupling structure 84 from rotating relative to the base member 18 about the guide rotational axis A4.

As seen in FIG. 13, the guide device 76 includes a guide actuator 86 to move the guide member 78 in the first guide direction D5. The guide actuator 86 generates an actuating force to rotate the guide shaft 82 relative to the base member 18 about the guide rotational axis A4. The guide device 76 includes an intermediate gear 88 to transmit rotation of the guide actuator 86 to the guide shaft 82 at a specific gear ratio. The intermediate gear 88 is a reduction gear, for example.

While the guide device 76 includes the guide actuator 86 to move the guide member 78 in response to the input shift signal in this embodiment, the guide member 78 can be operated via a mechanical control cable such as a Bowden cable.

As seen in FIGS. 4 and 13, the guide device 76 includes a tensioner 90 contactable with the first coupling member 24. In this embodiment, the tensioner 90 comprises a tension pulley to engage with the first coupling member 24. The guide unit 80 guides the tensioner 90 in a second guide direction D6 to adjust tension of the first coupling member 24. The second guide direction D6 is different from the first guide direction D5 and the transmission axial direction D1. The guide member 78 and the tensioner 90 are arranged in the second guide direction D6. The second guide direction D6 is preferably perpendicular to the first guide direction D5 and the transmission axial direction D1.

The guide device 76 includes a first guide pole 91, a second guide pole 92, and a biasing element 93. The first guide pole 91 and the second guide pole 92 extend in the second guide direction D6 to guide the tensioner 90 in the second guide direction D6. The biasing element 93 biases the tensioner 90 along the first guide pole 91 and the second guide pole 92 in the second guide direction D6. The biasing element 93 pulls the tensioner 90 toward the guide member 78 in the second guide direction D6. While the biasing element 93 is a tension spring in this embodiment, the biasing element 93 can be members other than the tension spring. The tensioner 90 is a pulley, for example.

As seen in FIG. 13, the tensioner 90 moves integrally with the guide member 78 relative to the base member 18 (FIG. 4) in the first guide direction D5. The tensioner 90 guides the first coupling member 24 together with the guide member 78.

As seen in FIG. 4, the base member 18 stores lubricant in the internal space 26. The base member 18 includes a supply port 94 through which the lubricant is to be supplied to the internal space 26. Furthermore, the bicycle transmission apparatus 14 comprises a lubricant supply device 95 to apply lubricant to the first coupling member 24. The lubricant supply device 95 is attached to the guide member 78 to move integrally with the guide member 78. The bicycle transmission apparatus 14 comprises an additional lubricant supply device 100 to supply lubricant to the input coupling member 30. The additional lubricant supply device 100 is attached to the base member 18.

Figure 14:
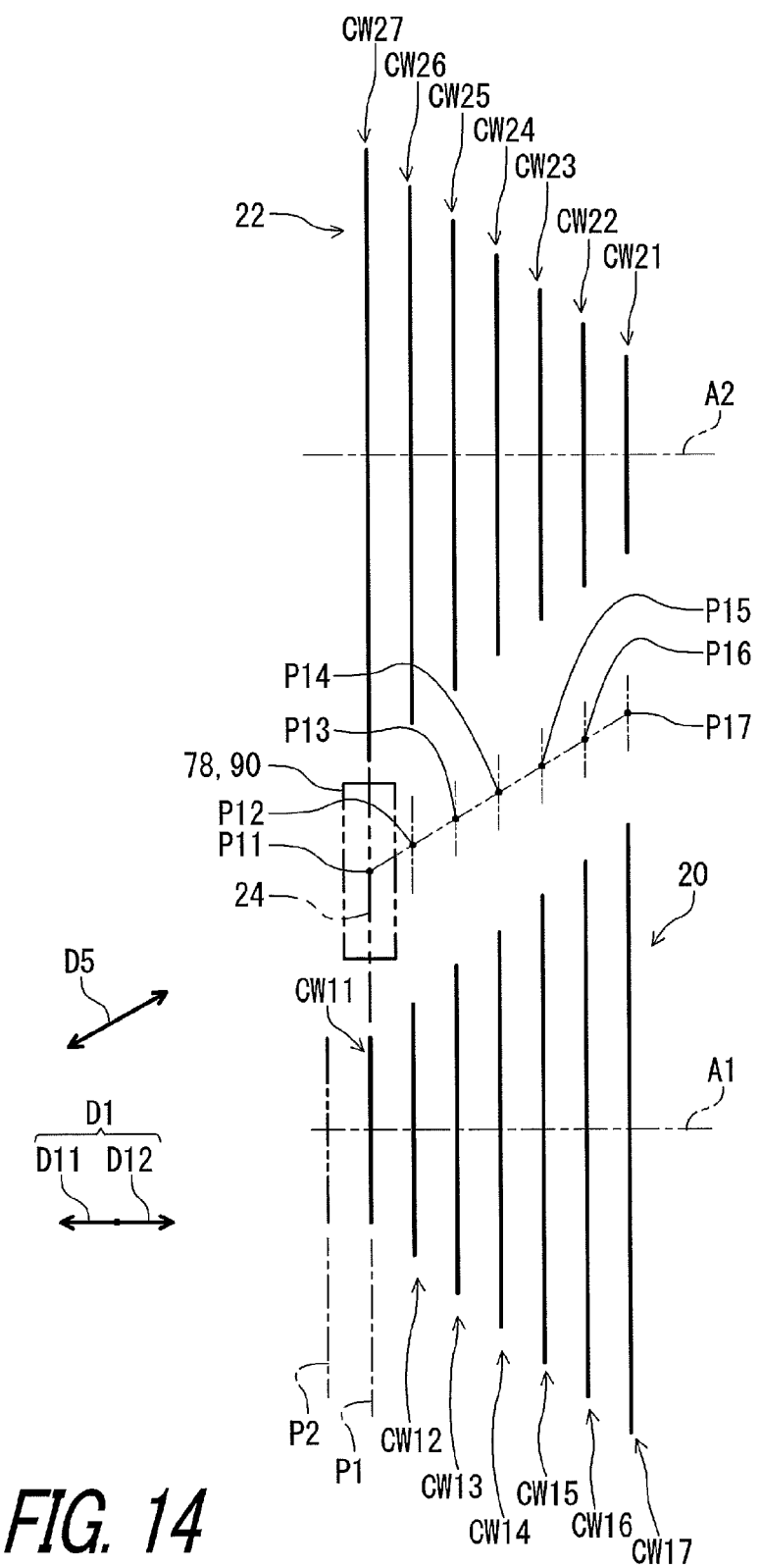
FIG. 14 is a schematic diagram showing an arrangement of the first transmission member, the second transmission member, and the guide device of the bicycle transmission apparatus illustrated in FIG. 1.

As seen in FIG. 14, the guide device 76 moves and positions the guide member 78 between first to seventh guide positions P11 to P17 in the first guide direction D5. The first to seventh guide positions P11 to P17 respectively correspond to the second cogwheels CW27 to CW21.

Figure 15:
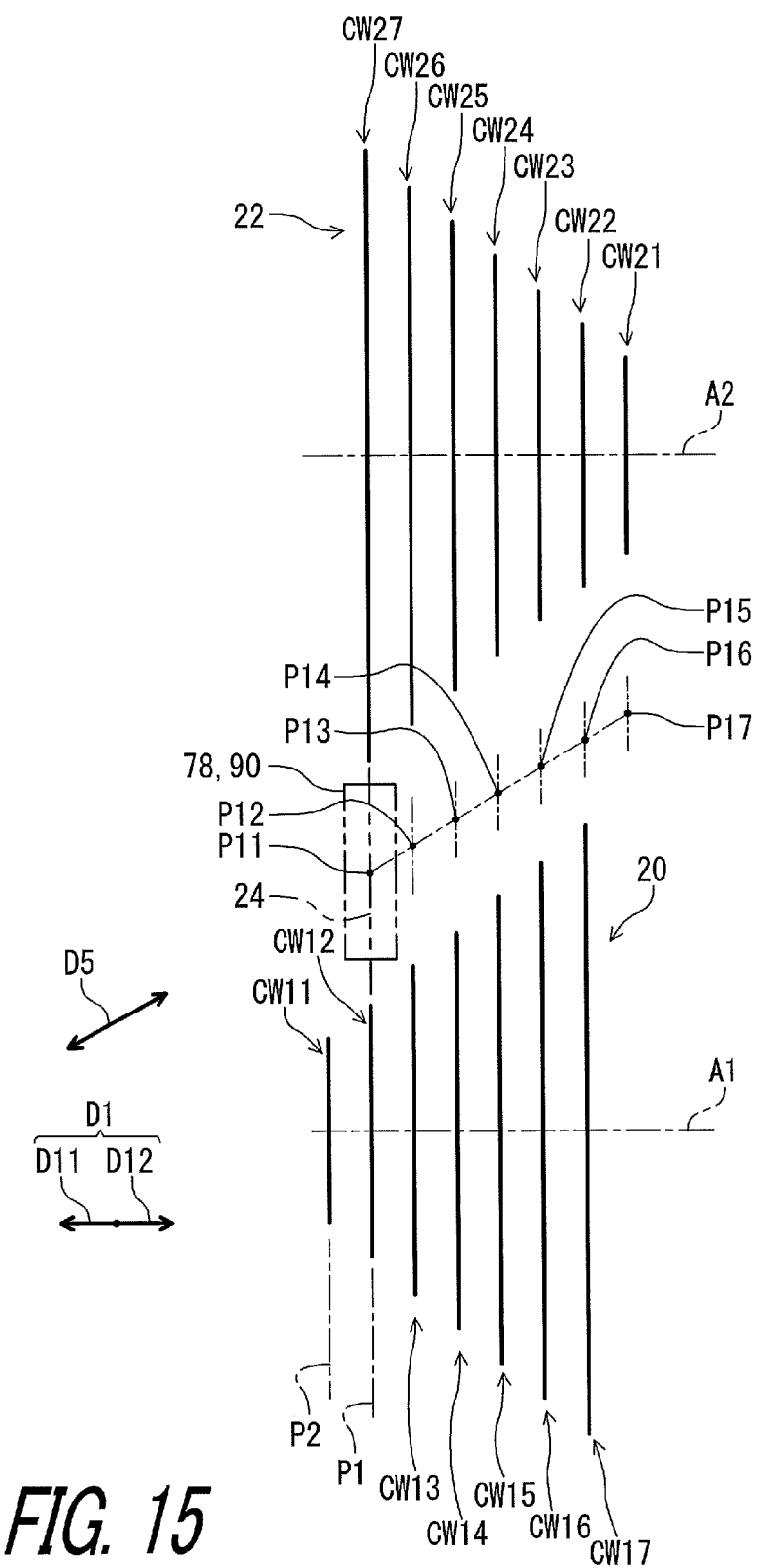
FIG. 15 is a schematic diagram showing an arrangement of the first transmission member, the second transmission member, and the guide device of the bicycle transmission apparatus illustrated in FIG. 1.

As seen in FIGS. 14 and 15, the first transmission member 20 is movable relative to the base member 18 and the first coupling member 24 in the first transmission axial direction D11 without changing an axial relative position between the first coupling member 24 and the second transmission member 22 during one of upshifting and downshifting. In this embodiment, the first transmission member 20 is movable relative to the base member 18 and the first coupling member 24 in the first transmission axial direction D11 without changing an axial relative position between the first coupling member 24 and the second transmission member 22 during the upshifting. Furthermore, the first transmission member 20 is movable relative to the base member 18 and the first coupling member 24 in the second transmission axial direction D12 without changing the axial relative position between the first coupling member 24 and the second transmission member 22 during the downshifting.

Figure 16:
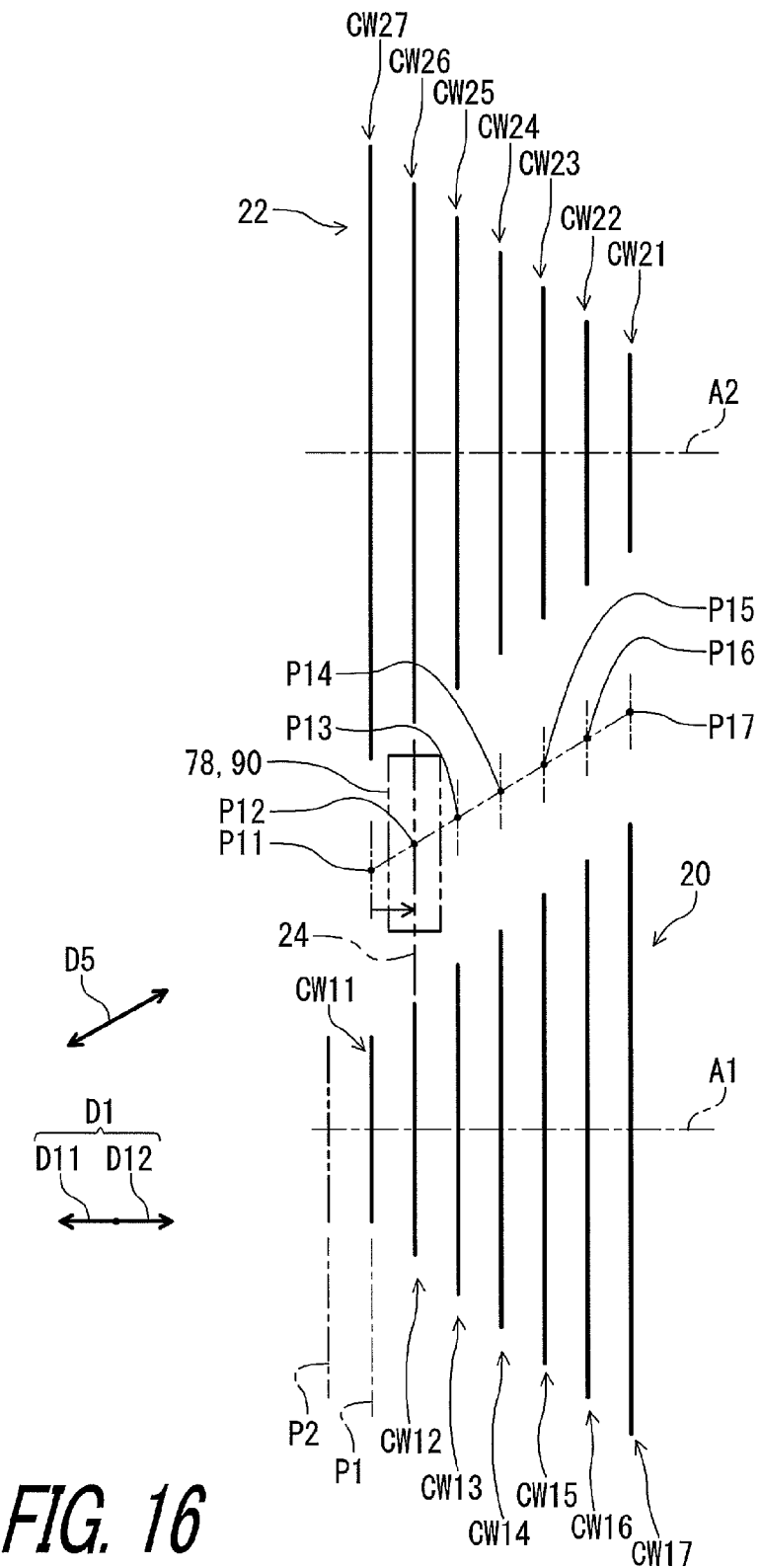
FIG. 16 is a schematic diagram showing an arrangement of the first transmission member, the second transmission member, and the guide device of the bicycle transmission apparatus illustrated in FIG. 1.

As seen in FIGS. 15 and 16, the first transmission member 20 is movable together with the first coupling member 24 relative to the base member 18 in the second transmission axial direction D12 so as to change the axial relative position between the first coupling member 24 and the second transmission member 22 during another of the upshifting and the downshifting. In this embodiment, the first transmission member 20 is movable together with the first coupling member 24 relative to the base member 18 in the second transmission axial direction D12 so as to change the axial relative position between the first coupling member 24 and the second transmission member 22 during the upshifting. Furthermore, the first transmission member 20 is movable together with the first coupling member 24 relative to the base member 18 in the first transmission axial direction D11 so as to change the axial relative position between the first coupling member 24 and the second transmission member 22 during the downshifting.

Figure 17:
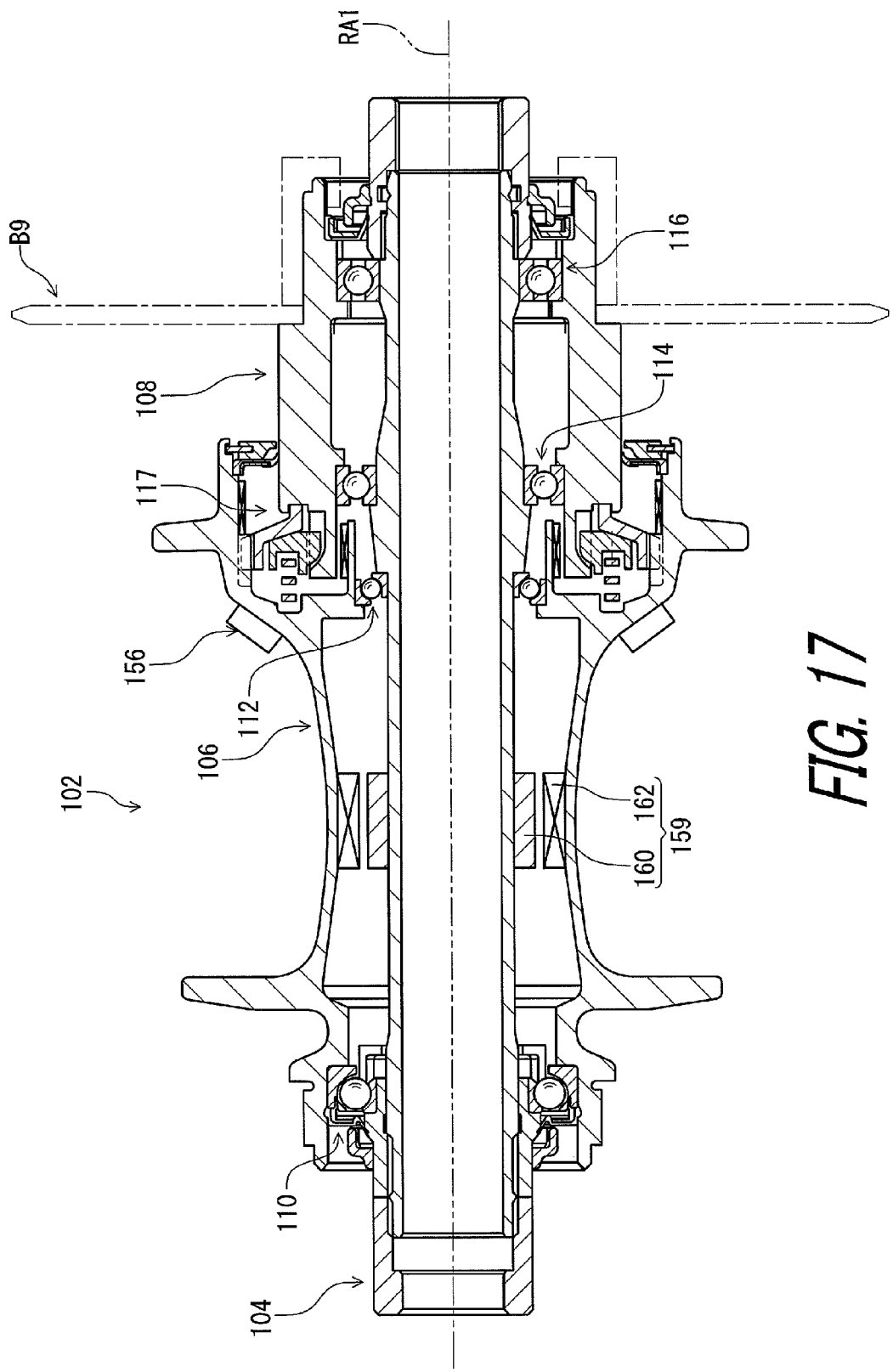
FIG. 17 is a cross-sectional view of a bicycle hub assembly of the bicycle transmission system illustrated in FIG. 1.

As seen in FIG. 1, the bicycle transmission system 12 comprises a bicycle hub assembly 102. As seen in FIG. 17, the bicycle hub assembly 102 comprises a hub axle 104, a hub shell 106, and a sprocket support body 108. The hub axle 104 defines a rotational axis RA1. For example, the hub axle 104 is coupled to the second frame B32 (FIG. 1). The hub shell 106 is rotatably mounted on the hub axle 104 to rotate about the rotational axis RA1. A rim B63 (FIG. 1) is coupled to the hub shell 106 via spokes B64 (FIG. 1). The sprocket support body 108 is rotatably mounted on the hub axle 104 to rotate about the rotational axis RA1. The sprocket support body 108 is rotatable relative to the hub axle 104 and the hub shell 106 about the rotational axis RA1.

As seen in FIG. 17, the sprocket support body 108 is mounted to the hub axle 104 to support the rear sprocket B9. The sprocket support body 108 is mounted to the hub axle 104 to receive a rotational force from the rear sprocket B9 during pedaling. As seen in FIG. 1, the bicycle transmission apparatus 14 couples the bicycle crank B7 to the sprocket support body 108 of the bicycle hub assembly 102 to transmit a pedaling rotational force RF1. As seen in FIG. 17, the bicycle hub assembly 102 comprises a first bearing 110 and a second bearing 112. The first bearing 110 and the second bearing 112 are provided between the hub axle 104 and the hub shell 106 to rotatably support the hub shell 106 relative to the hub axle 104 about the rotational axis RA1.

The bicycle hub assembly 102 comprises a third bearing 114 and a fourth bearing 116. The third bearing 114 and the fourth bearing 116 are provided between the hub axle 104 and the sprocket support body 108 to rotatably support the sprocket support body 108 relative to the hub axle 104 about the rotational axis RA1.

Figure 18:
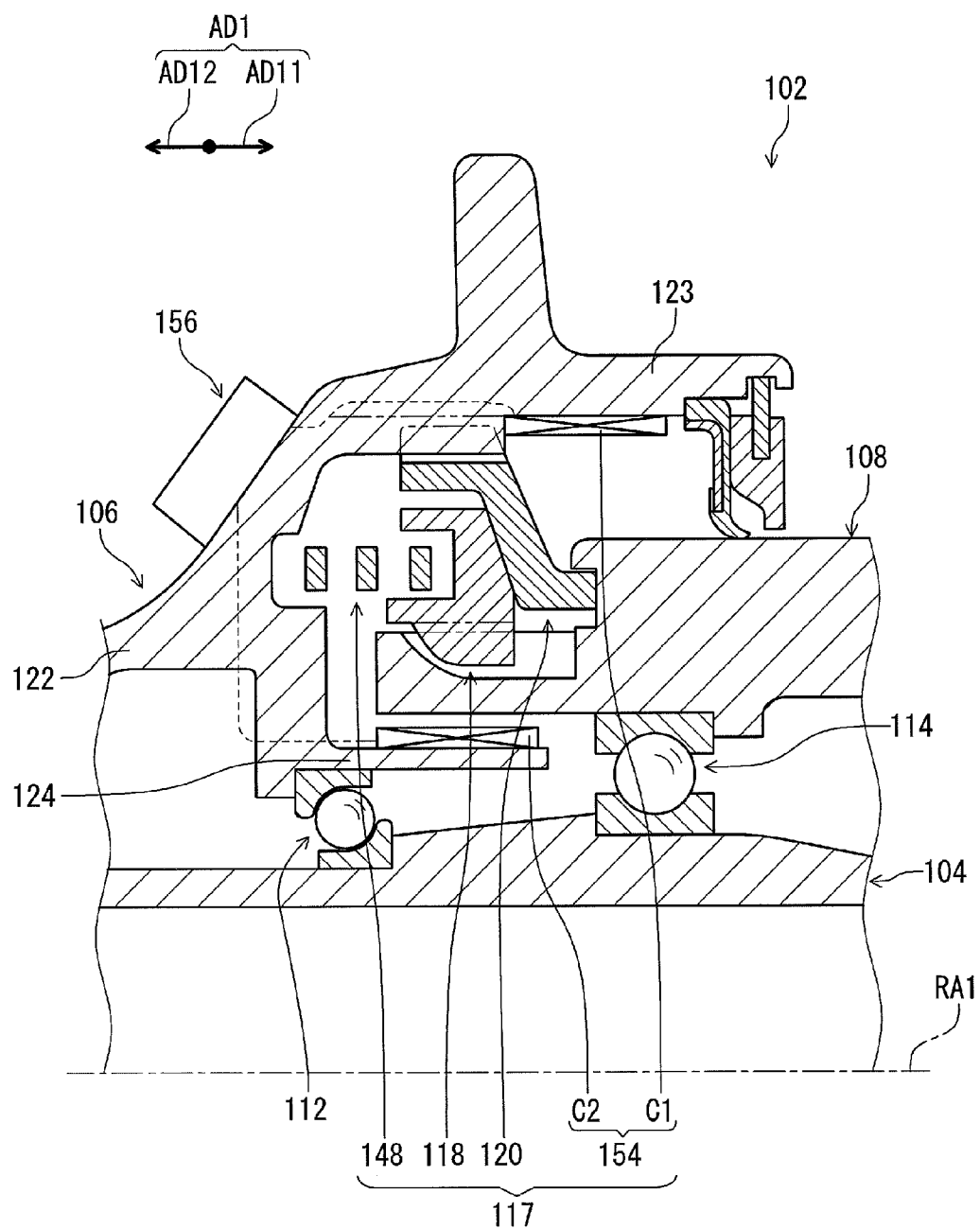
FIG. 18 is a partial enlarged cross-sectional view of the bicycle hub assembly illustrated in FIG. 17.

As seen in FIG. 18, the bicycle hub assembly 102 comprises a clutch 117. The clutch 117 includes a first ratchet member 118 and a second ratchet member 120. The first ratchet member 118 is mounted to the sprocket support body 108 to rotate together with the sprocket support body 108 relative to the hub shell 106 about the rotational axis RA1. The first ratchet member 118 is movable relative to the sprocket support body 108 in an axial direction AD1 parallel to the rotational axis RA1. In this embodiment, the axial direction AD1 includes a first axial direction AD11 and a second axial direction AD12 opposite to the first axial direction AD11. The second ratchet member 120 is mounted to the hub shell 106 to rotate together with the hub shell 106 relative to the sprocket support body 108 about the rotational axis RA1. The second ratchet member 120 is not movable relative to the hub shell 106 in the axial direction AD1. The sprocket support body 108, the first ratchet member 118, and the second ratchet member 120 provide a bicycle freewheel in the bicycle hub assembly 102.

Figure 19:
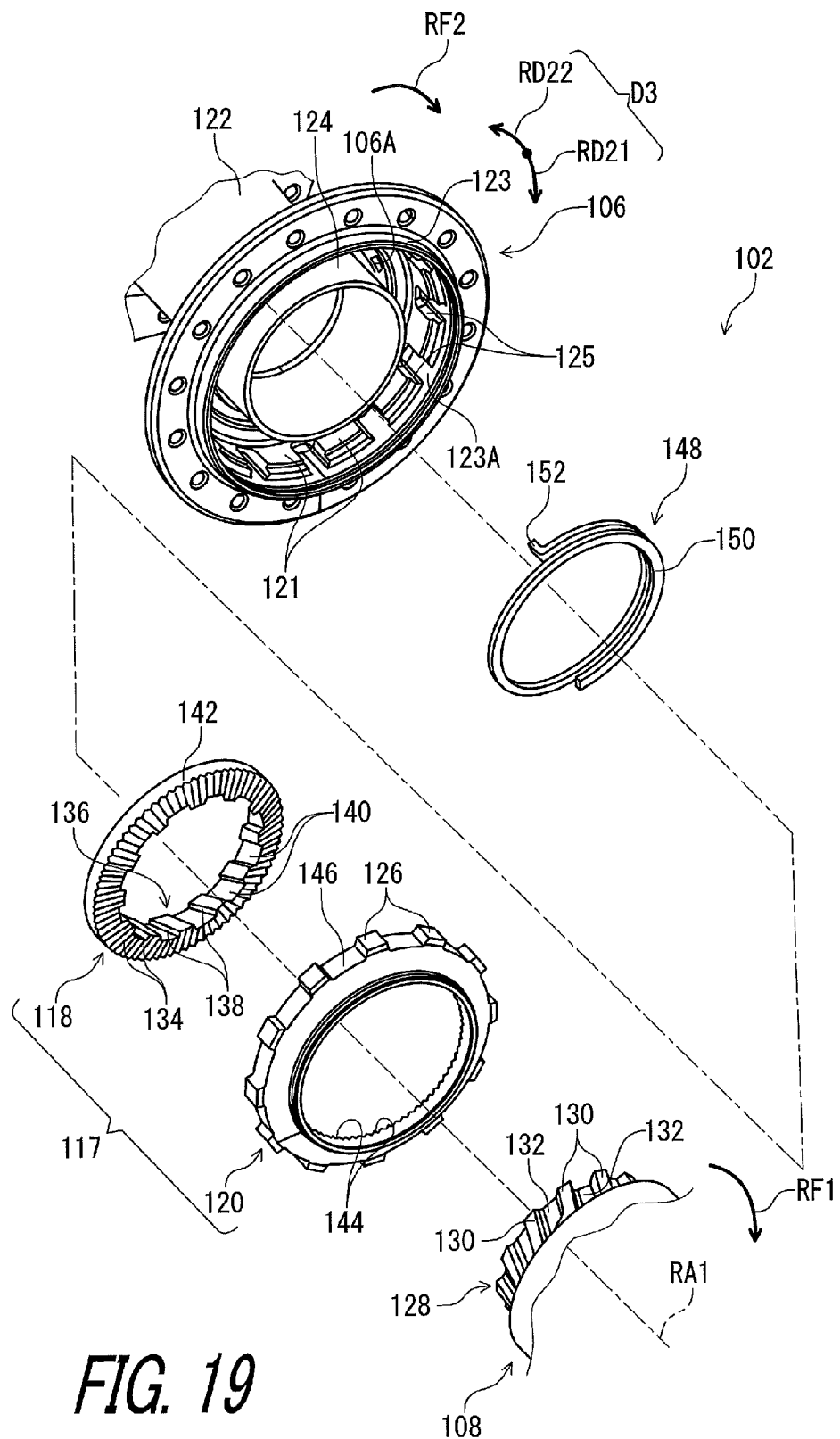
FIG. 19 is an exploded perspective view of the bicycle hub assembly illustrated in FIG. 17.

As seen in FIG. 19, the clutch 117 prevents the sprocket support body 108 from rotating relative to the hub shell 106 in a driving rotational direction RD21 so that the pedaling rotational force RF1 is transmitted from the sprocket support body 108 to the hub shell 106 during pedaling. The clutch 117 allows the hub shell 106 to rotate relative to the sprocket support body 108 in the driving rotational direction RD21 so that a coasting rotational force RF2 is not transmitted from the hub shell 106 to the sprocket support body 108 during coasting (also called freewheeling). The driving rotational direction RD21 is a direction in which the sprocket support body 108 rotates relative to the bicycle frame B3 (FIG. 1) during pedaling. A circumferential direction D3 of the bicycle hub assembly 102 includes the driving rotational direction RD21 and an opposite rotational direction RD22 opposite to the driving rotational direction RD21. Coasting or freewheeling occurs when the sprocket support body 108 stops rotating relative to the bicycle frame B3 (FIG. 1) in the opposite rotational direction RD22 while the hub shell 106 rotates relative to the bicycle frame B3 (FIG. 1) in the driving rotational direction RD21.

As seen in FIG. 19, the hub shell 106 includes at least one first tooth 121. In this embodiment, the hub shell 106 includes a plurality of first teeth 121. The hub shell 106 further includes a shell body 122, a first annular part 123, and a second annular part 124. The first annular part 123 extends from the shell body 122 in the axial direction AD1. The first annular part 123 includes an inner peripheral surface 123A. The first teeth 121 are provided on the inner peripheral surface 123A of the first annular part 123 and extend radially inward from the inner peripheral surface 123A. The first teeth 121 are arranged in a circumferential direction D3 to define recesses 125 between adjacent two teeth of the first teeth 121. The circumferential direction D3 is defined about the rotational axis RA1 and includes the driving rotational direction RD21 and the opposite rotational direction RD22.

As seen in FIG. 19, the second annular part 124 extends from the shell body 122 in the axial direction AD1. The second annular part 124 is provided radially inward of the first annular part 123. The second bearing 112 is radially provided between the second annular part 124 and the hub axle 104.

The second ratchet member 120 includes at least one second tooth 126. The at least one second tooth 126 is engaged with the at least one first tooth 121. In this embodiment, the second ratchet member 120 includes a plurality of second teeth 126. The second teeth 126 are engaged with the first teeth 121. The second teeth 126 are arranged in the circumferential direction D3. The second teeth 126 are respectively provided in the recesses 125.

As seen in FIG. 19, the sprocket support body 108 includes a first helical spline 128. The first helical spline 128 includes first spline teeth 130 and first spline grooves 132 defined between adjacent two teeth of the first spline teeth 130. The first ratchet member 118 comprises at least one first ratchet tooth 134 and a second helical spline 136 engaged with the first helical spline 128. In this embodiment, the first ratchet member 118 comprises a plurality of first ratchet teeth 134. The first ratchet teeth 134 are arranged in the circumferential direction D3. The second helical spline 136 includes second spline teeth 138 and second spline grooves 140 defined between adjacent two teeth of the second spline teeth 138. The second spline teeth 138 are respectively provided in the first spline grooves 132. The first spline teeth 130 are respectively provided in the second spline grooves 140.

In this embodiment, the first ratchet member 118 includes a first ratchet body 142. The first ratchet body 142 has an annular shape. The first ratchet teeth 134 are provided on an axial side of the first ratchet body 142. The first ratchet teeth 134 radially extend relative to the rotational axis RA1. The first ratchet teeth 134 provide a serration on the axial side of the first ratchet body 142. The second helical spline 136 is provided on an inner periphery of the first ratchet body 142. The second spline teeth 138 are provided on the inner periphery of the first ratchet body 142.

Figure 20:
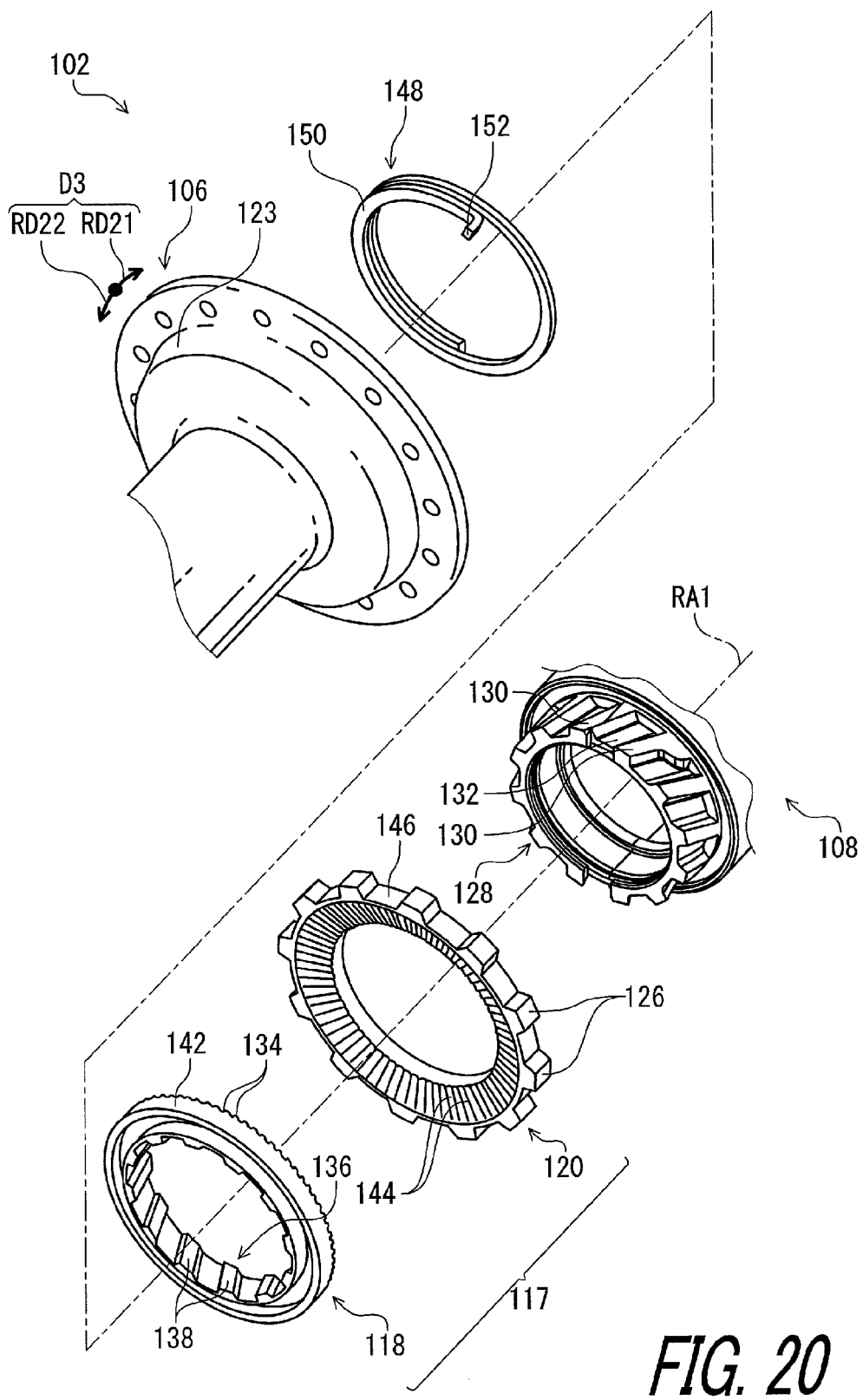
FIG. 20 is an exploded perspective view of the bicycle hub assembly illustrated in FIG. 17.

As seen in FIG. 20, the second ratchet member 120 includes at least one second ratchet tooth 144. The at least one second ratchet tooth 144 is engageable with the at least one first ratchet tooth 134. In this embodiment, the second ratchet member 120 comprises a plurality of second ratchet teeth 144. The second ratchet teeth 144 are arranged in the circumferential direction D3. The second ratchet teeth 144 are engageable with the first ratchet teeth 134. The first ratchet member 118 and the second ratchet member 120 rotate together in a state where the second ratchet teeth 144 are engaged with the first ratchet teeth 134.

In this embodiment, the second ratchet member 120 includes a second ratchet body 146. The second ratchet body 146 has an annular shape. The second teeth 126 are provided on an outer peripheral surface of the second ratchet body 146. The second ratchet teeth 144 are provided on an axial side of the second ratchet body 146. The second ratchet teeth 144 radially extend relative to the rotational axis RA1. The second ratchet teeth 144 provide a serration on the axial side of the second ratchet body 146. The second teeth 126 extend radially outwardly from the second ratchet body 146.

As seen in FIG. 20, the clutch 117 includes a biasing member 148. As seen in FIG. 18, the biasing member 148 is provided between the hub shell 106 and the first ratchet member 118 in the axial direction AD1 to bias the first ratchet member 118 toward the second ratchet member 120. In this embodiment, for example, the biasing member 148 is a compression spring.

As seen in FIG. 18, the biasing member 148 is compressed between the hub shell 106 and the first ratchet member 118 in the axial direction AD1. The biasing member 148 biases the first ratchet member 118 toward the second ratchet member 120 to maintain an engagement state where the first ratchet member 118 and the second ratchet member 120 are engaged with each other via the first ratchet teeth 134 and the second ratchet teeth 144.

Preferably, the biasing member 148 is mounted to the hub shell 106 to rotate together with the hub shell 106 about the rotational axis RA1. As seen in FIG. 19, the biasing member 148 includes a coiled body 150 and a connecting end 152. The hub shell 106 includes a connecting hole 106A. The connecting end 152 is provided in the connecting hole 106A so that the biasing member 148 rotates together with the hub shell 106 about the rotational axis RA1.

Figure 21:
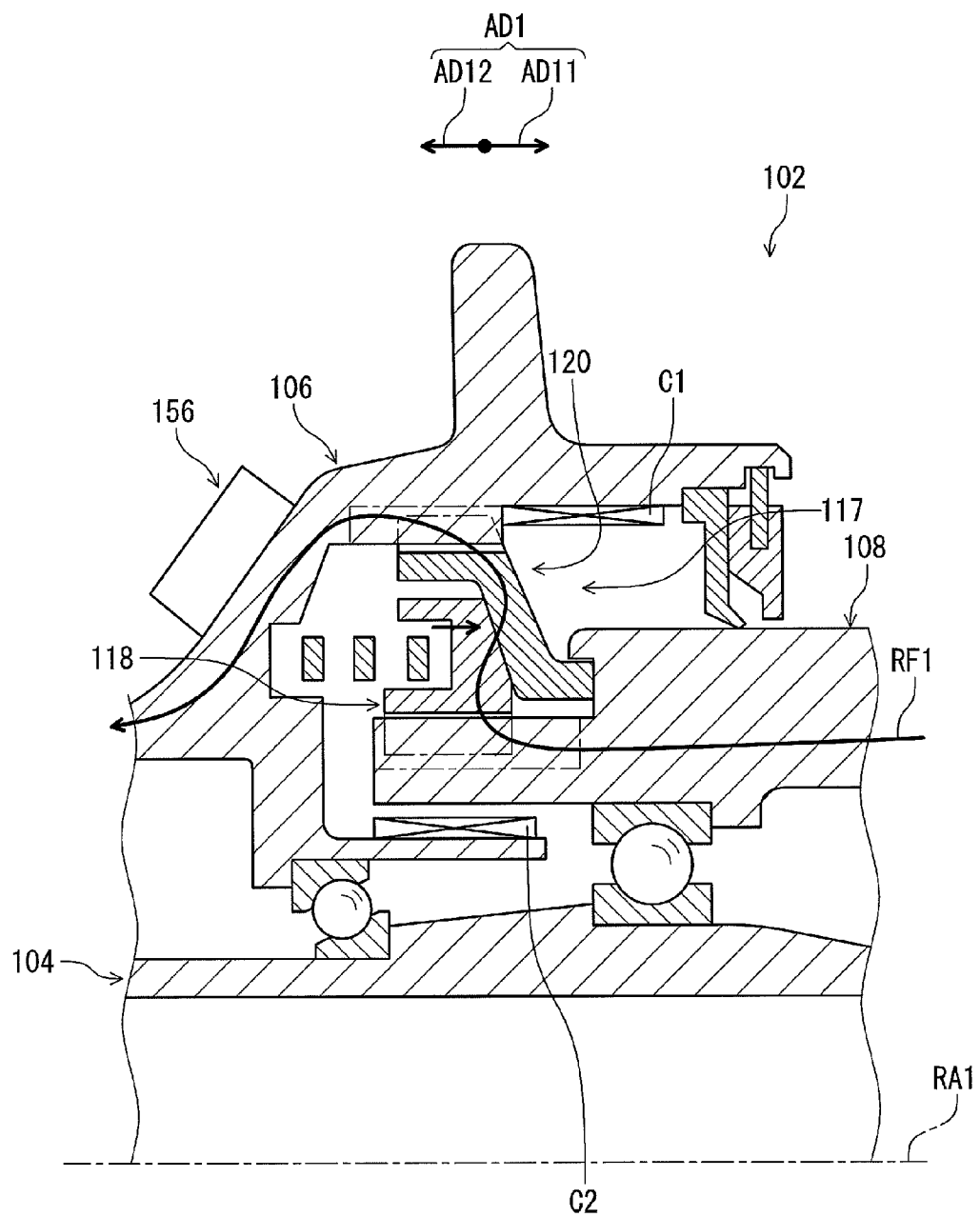
FIG. 21 is a cross-sectional view of the bicycle hub assembly illustrated in FIG. 17 (first coupling state).
Figure 22:
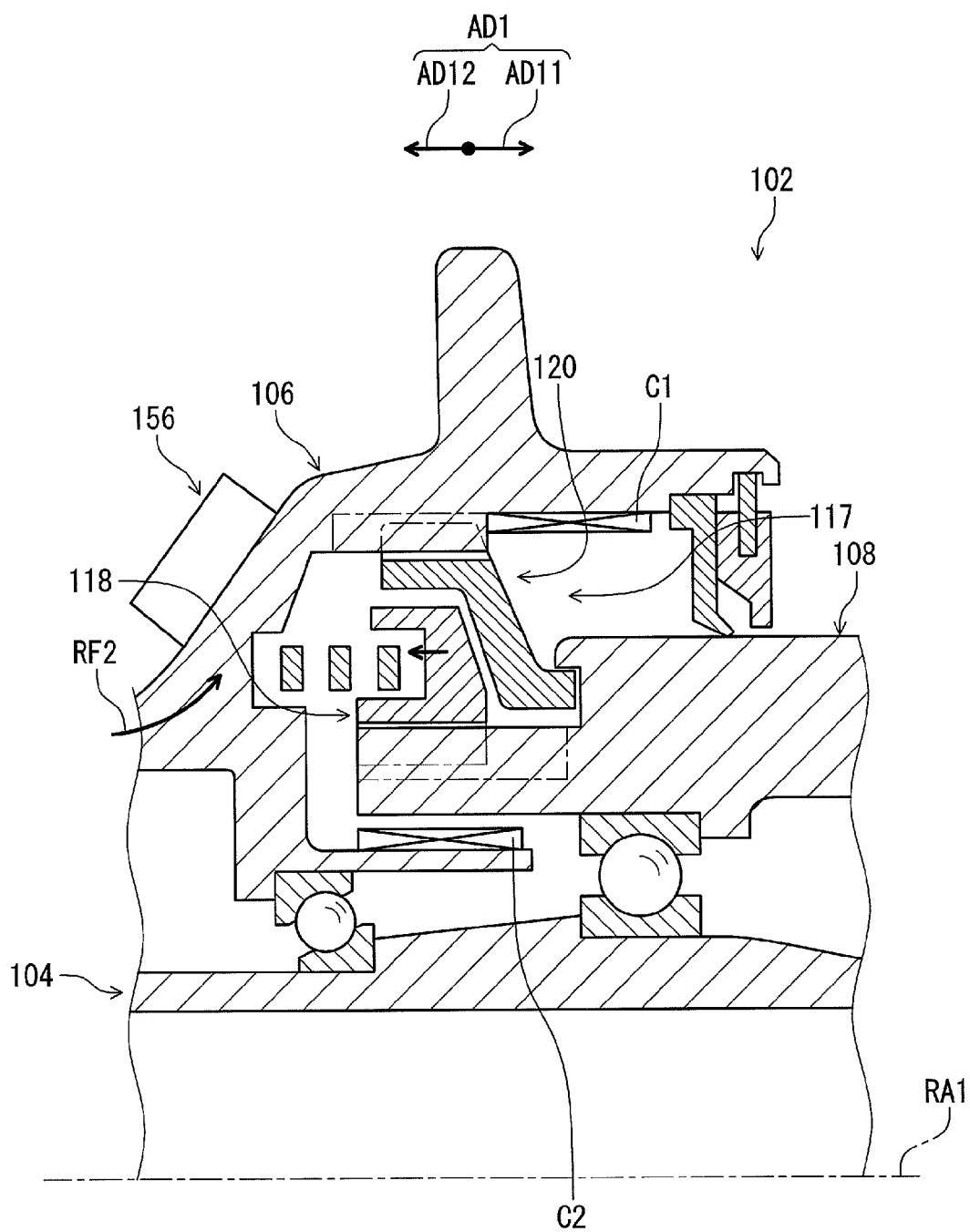
FIG. 22 is a cross-sectional view of the bicycle hub assembly illustrated in FIG. 17 (first release state).
Figure 23:
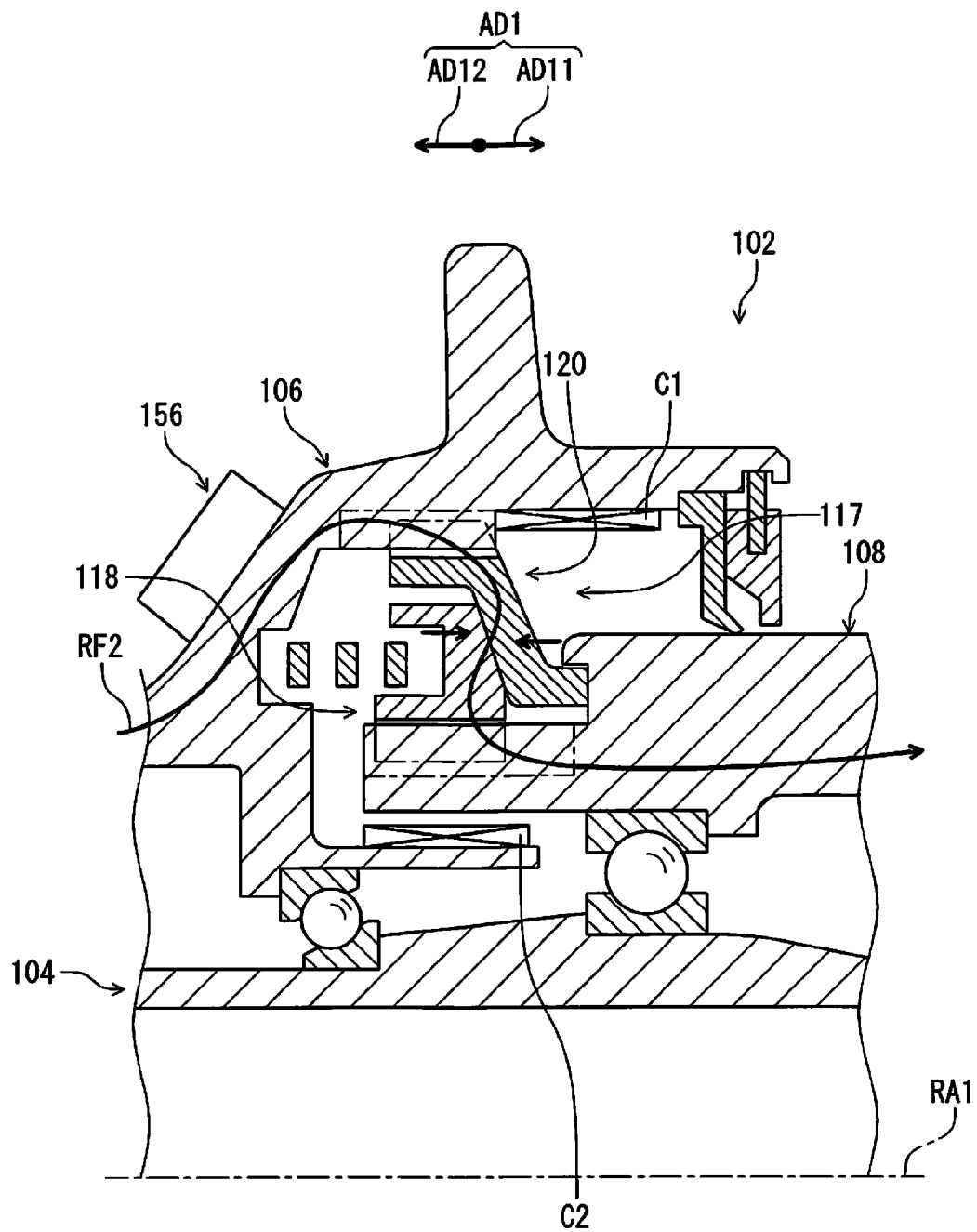
FIG. 23 is a cross-sectional view of the bicycle hub assembly illustrated in FIG. 17 (second coupling state).

As seen in FIGS. 21 to 23, the clutch 117 has a first coupling state, a first release state, and a second coupling state. As seen in FIG. 21, in the first coupling state, the pedaling rotational force RF1 is transmitted from the sprocket support body 108 to the hub shell 106 in the first rotational direction RD1 during pedaling. As seen in FIG. 22, in the first release state, the hub shell 106 is rotatable relative to the sprocket support body 108 in the first rotational direction RD1 during coasting. In the first release state, the coasting rotational force RF2 is not transmitted from the hub shell 106 to the sprocket support body 108. As seen in FIG. 23, in the second coupling state, the coasting rotational force RF2 is transmitted from the hub shell 106 to the sprocket support body 108 in the first rotational direction RD1 during coasting.

As seen in FIG. 18, the clutch 117 includes an actuator 154 to bias the first ratchet member 118 toward the second ratchet member 120 to bring the at least one first ratchet tooth 134 in engagement with the at least one second ratchet tooth 144 using electric power. In this embodiment, the first ratchet member 118 includes iron. The second ratchet member 120 includes iron. However, the first ratchet member 118 and the second ratchet member 120 can include a magnetic material other than iron instead of or in addition to iron. The members (e.g., the hub shell 106 and the sprocket support body 108) other than the first ratchet member 118 and the second ratchet member 120 are made of a non-magnetic material such as aluminum and a resin material. The hub shell 106 can include iron or a magnetic material other than iron instead of or in addition to iron.

The actuator 154 includes a first coil C1 to generate magnetic field to bias the first ratchet member 118 toward the second ratchet member 120. The actuator 154 includes a second coil C2 to generate magnetic field to bias the first ratchet member 118 toward the second ratchet member 120. The second coil C2 is provided radially inward of the first coil C1. While the actuator 154 includes the first coil C1 and the second coil C2 in this embodiment, the actuator 154 can include one of the first coil C1 and the second coil C2.

The first coil C1 is provided radially outward of at least one of the first ratchet member 118 and the second ratchet member 120. The second coil C2 is provided radially inward of at least one of the first ratchet member 118 and the second ratchet member 120. In this embodiment, the second coil C2 is provided radially inward of the first ratchet member 118 and the second ratchet member 120. However, the second coil C2 can be provided radially inward of one of the first ratchet member 118 and the second ratchet member 120.

Each of the first coil C1 and the second coil C2 is mounted to the hub shell 106. The first coil C1 is attached to the first annular part 123. The second coil C2 is attached to the second annular part 124. However, the first coil C1 and the second coil C2 can be mounted to the sprocket support body 108. Each of the first coil C1 and the second coil C2 is insulated from the hub shell 106 or the sprocket support body 108 if the hub shell 106 or the sprocket support body 108 is made by a conducting material.

Figure 24:
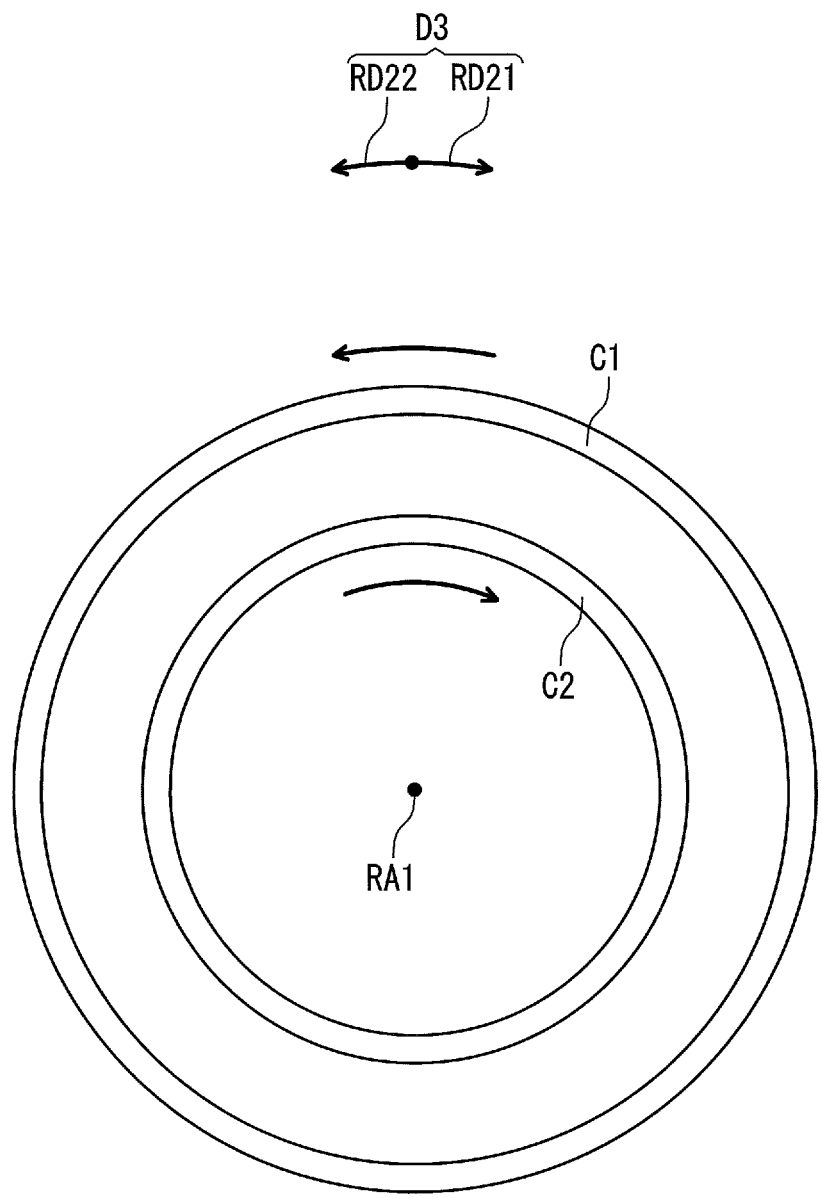
FIG. 24 shows flow directions of currents flowing in a first coil and a second coil of the bicycle hub assembly illustrated in FIG. 17.

As seen in FIG. 24, in this embodiment, current flows in the first coil C1 about the rotational axis RA1 in the opposite rotational direction RD22. Current flows in the second coil C2 about the rotational axis RA1 in the driving rotational direction RD21.

Figure 25:
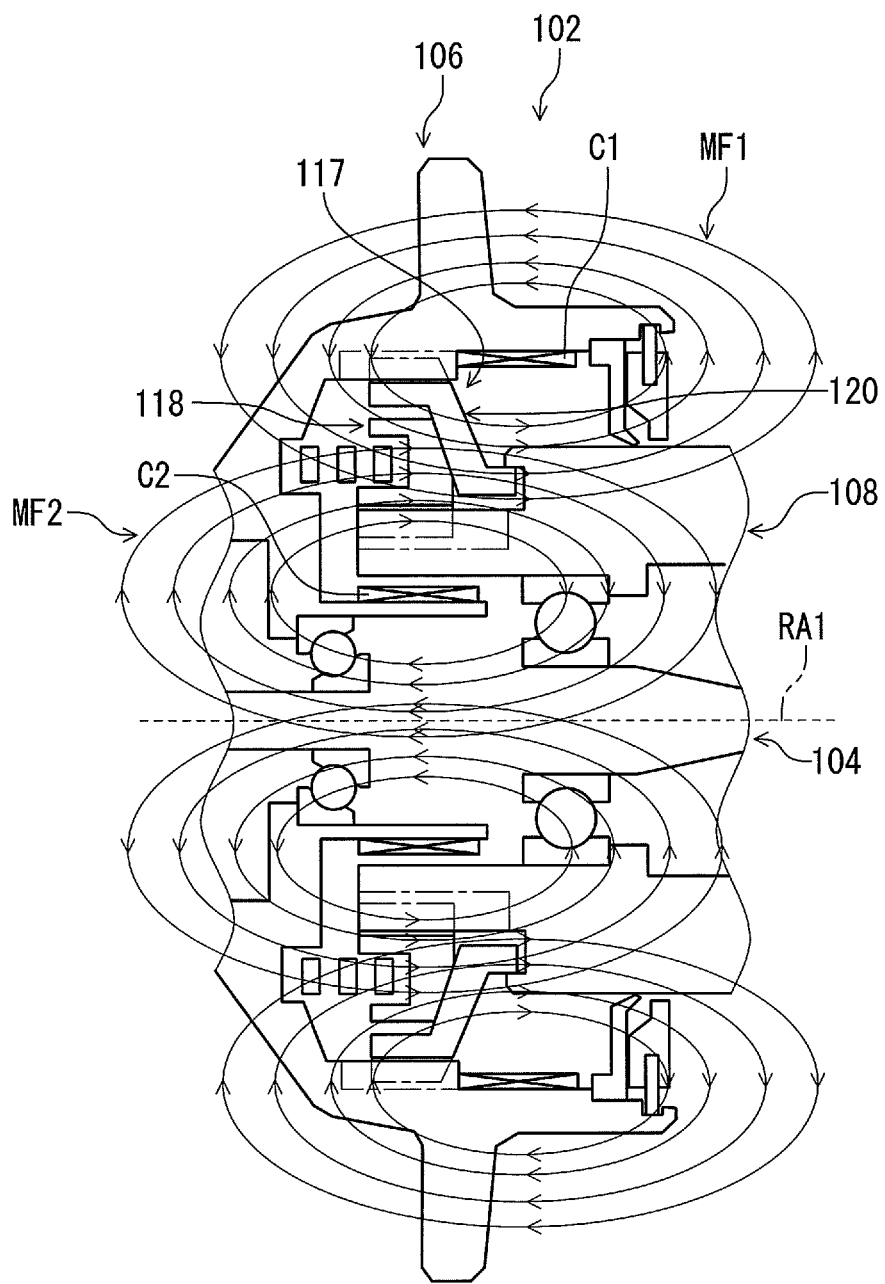
FIG. 25 shows magnetic fields generated by currents flowing in the first coil and the second coil of the bicycle hub assembly illustrated in FIG. 17.

As seen in FIG. 25, current flowing in the first coil C1 generates a first magnetic field MF1 about the first coil C1. The first magnetic field MF1 directs the first axial direction AD11 in a space provided radially inward of the first coil C1. Current flowing in the second coil C2 generates a second magnetic field MF2 about the second coil C2. The second magnetic field MF2 directs the second axial direction AD12 in a space provided radially outward of the second coil C2. Thus, a total magnetic field MF3 is generated in a space provided radially between the first coil C1 and the second coil C2. The total magnetic field MF3 causes the first ratchet member 118 and the second ratchet member 120 to attract each other, bringing the first ratchet teeth 134 into engagement with the second ratchet teeth 144. This changes the state of the clutch 117 to the second coupling state to transmit the coasting rotational force RF2 from the hub shell 106 to the sprocket support body 108.

Figure 26:
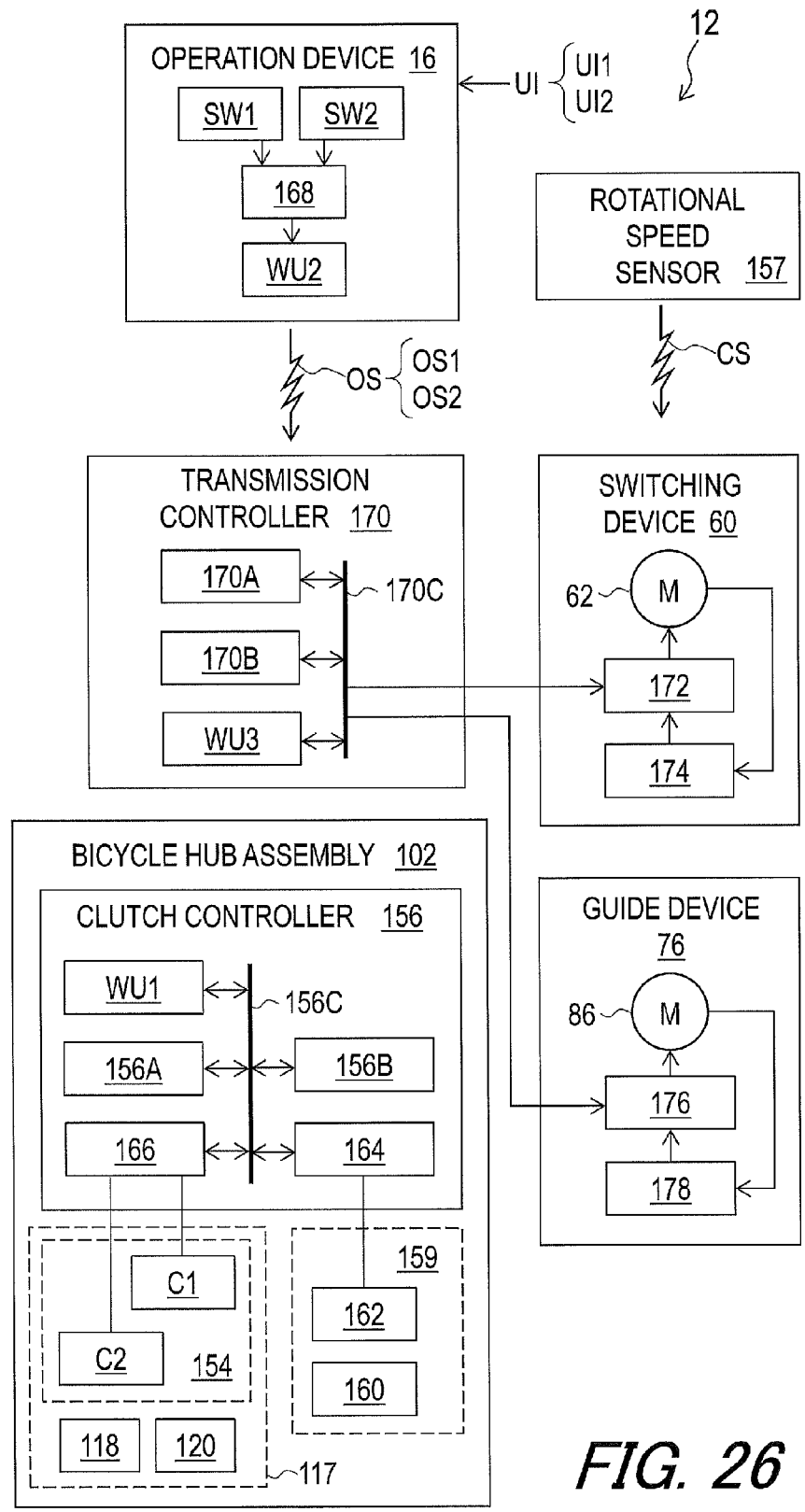
FIG. 26 is a block diagram of the bicycle transmission system illustrated in FIG. 1.

As seen in FIG. 26, the bicycle hub assembly 102 further comprises a clutch controller 156 to control the electric power applied to the clutch 117 in response to the operation signal OS. The clutch controller 156 changes the state of the clutch 117 to the second coupling state based on the operation signal OS when the bicycle crank B7 does not rotate. Namely, the clutch controller 156 changes the state of the clutch 117 to the second coupling state based on the operation signal OS when a rotational speed of the bicycle crank B7 is zero. As seen in FIG. 18, the clutch controller 156 is mounted to the hub shell 106. The clutch controller 156 can be mounted on an outside surface of the hub shell 106 or an inside space of the hub shell 106. However, the clutch controller 156 can be mounted to the hub axle 104. In this case, the clutch controller 156 is electrically connected to the first and second coils C1 and C2 via a slip ring.

As seen in FIG. 26, the bicycle transmission system 12 further comprises a rotational speed sensor 157 to sense a rotational speed of the bicycle crank B7 as a cadence CS. The rotational speed sensor 157 is attached to the bicycle frame B3 (FIG. 1), for example. The rotational speed sensor 157 senses a rotational speed of the crank arm B71 of the bicycle crank B7. For example, the rotational speed sensor 157 detects a detected member 158 such as a magnet attached to the crank arm B71 (FIG. 1). The rotational speed sensor 157 includes a reed switch or a hall effect element. The rotational speed sensor 157 further includes a wireless transmitting unit to transmit a signal of the cadence CS.

The clutch controller 156 controls the clutch 117 to keep the second coupling state in a case where the clutch controller 156 receives the operation signal OS when the bicycle crank B7 rotates. Namely, the clutch controller 156 controls the clutch 117 to keep the second coupling state in a case where the clutch controller 156 receives the operation signal OS when the rotational speed of the bicycle crank B7 is not zero.

As seen in FIG. 26, the clutch controller 156 is constituted as a microcomputer and includes a processor 156A and a memory 156B. The processor 156A includes a central processing unit (CPU) and a memory controller. The memory 156B includes a read only memory (ROM) and a random access memory (RAM). The memory 156B can be also referred to as the storage device 156B. The ROM includes a non-transitory computer-readable storage medium. The RAM includes a transitory computer-readable storage medium. The memory 156B includes storage areas each having an address in the ROM and the RAM. The processor 156A controls the memory 156B to store data in the storage areas of the memory 156B and reads data from the storage areas of the memory 156B.

At least one program is stored in the memory 156B (e.g., the ROM). The at least one program is read into the processor 156A, and thereby functions of the clutch controller 156 are performed. The processor 156A and the memory 156B are mounted on a substrate (not shown) and are connected with each other via a bus 156C.

While the functions of the clutch controller 156 are performed by software, the functions of the clutch controller 156 can be performed by hardware or by a combination of the software and the hardware if needed and/or desired.

As seen in FIG. 26, the bicycle hub assembly 102 further comprises a dynamo 159 to generate an alternate current (AC). The dynamo 159 includes a magnet 160 and a dynamo coil 162. The dynamo coil 162 is electrically connected to the clutch controller 156.

As seen in FIG. 17, the magnet 160 is mounted to the hub axle 104, and the dynamo coil 162 is mounted to the hub shell 106. However, the magnet 160 can be mounted to the hub shell 106, and the dynamo coil 162 can be mounted to the hub axle 104. In such an embodiment, for example, the dynamo coil 162 is electrically connected to the clutch controller 156 via a slip ring mounted between the hub axle 104 and the hub shell 106.

As seen in FIG. 26, the clutch controller 156 includes a rectification circuit 164 to rectify to change the AC to a direct current (DC). The rectification circuit 164 is electrically connected to the dynamo coil 162. The clutch controller 156 is powered by the dynamo 159 via the rectification circuit 164.

The clutch controller 156 includes a current control circuit 166 to control current supplied from the rectification circuit 164 to the first coil C1 and the second coil C2. The current control circuit 166 is electrically connected to the rectification circuit 164 and the processor 156A via the bus 156C. The current control circuit 166 is electrically connected to the first coil C1 and the second coil C2. The current control circuit 166 can be connected to the rectification circuit 164 directly if the voltage of the bus and coils are different.

The clutch controller 156 includes a wireless communication unit WU1 to establish wireless communication between the clutch controller 156 and the operation device 16. The wireless communication unit WU1 includes a wireless receiver to wirelessly receive the operation signal OS from the operation device 16. The wireless communication unit WU1 is electrically connected to the processor 156A, the memory 156B, and the rectification circuit 164 via the bus 156C. The wireless receiver of wireless communication unit WU1 also receives the signal of the cadence CS from the rotational speed sensor 157.

While the bicycle hub assembly 102 includes the dynamo 159 as a power source of the bicycle hub assembly 102 in this embodiment, the bicycle hub assembly 102 can include a power supply other than the dynamo 159 instead of or in addition to the dynamo 159. For example, the bicycle hub assembly 102 can include a battery instead of the dynamo 159. In such an embodiment, for example, the battery is mounted to the hub shell 106 and is electrically connected to the clutch controller 156.

While the first coil C1 and the second coil C2 are mounted to the hub shell 106 in this embodiment, the first coil C1 and the second coil C2 can be mounted to the hub axle 104. In such an embodiment, the clutch 117 is mounted to the hub axle 104, the dynamo coil 162 is mounted to the hub axle 104, and the magnet 160 is mounted to the hub shell 106.

In this embodiment, the bicycle transmission apparatus 14 is operated based on the operation signal OS. In this embodiment, the operation device 16 generates an upshift signal OS1 and a downshift signal OS2 as the operation signal OS. Specifically, the operation device 16 includes a first switch SW1 and a second switch SW2. The first switch SW1 receives a user input UI. The second switch SW2 receives the user input UI. In this embodiment, the user input UI includes an upshift input UI1 and a downshift input UI2. The first switch SW1 receives the upshift input UI1 as the user input UI. The second switch SW2 receives the downshift input UI2 as the user input UI.

The operation device 16 includes a signal controller 168 to generate the operation signal OS in response to the user input UI. Specifically, the signal controller 168 generates the upshift signal OS1 in response to the upshift input UI1. The signal controller 168 generates the downshift signal OS2 in response to the downshift input UI2.

The operation device 16 includes a wireless communication unit WU2 to establish wireless communication between the operation device 16 and each of the bicycle transmission apparatus 14 and the clutch controller 156 of the bicycle hub assembly 102. The wireless communication unit WU2 includes a wireless transmitter to wirelessly transmit the upshift signal OS1 and the downshift signal OS2 to each of the bicycle transmission apparatus 14 and the bicycle hub assembly 102.

As seen in FIG. 26, the bicycle transmission apparatus 14 further comprises a transmission controller 170. The transmission controller 170 controls the switching device 60 and the guide device 76. Specifically, the transmission controller 170 controls the switching actuator 62 and the guide actuator 86.

The transmission controller 170 is constituted as a microcomputer and includes a processor 170A and a memory 170B. The processor 170A includes a CPU and a memory controller. The memory 170B includes a ROM and a RAM. The memory 170B can be also referred to as the storage device 170B. The ROM includes a non-transitory computer-readable storage medium. The RAM includes a transitory computer-readable storage medium. The memory 170B includes storage areas each having an address in the ROM and the RAM. The processor 170A controls the memory 170B to store data in the storage areas of the memory 170B and reads data from the storage areas of the memory 170B.

At least one program is stored in the memory 170B (e.g., the ROM). The at least one program is read into the processor 170A, and thereby functions of the transmission controller 170 are performed. The processor 170A and the memory 170B are mounted on a substrate (not shown) and are connected with each other via a bus 170C.

The transmission controller 170 includes a wireless communication unit WU3 to establish wireless communication between the transmission controller 170 and the operation device 16. The wireless communication unit WU3 includes a wireless receiver to wirelessly receive the shift signal (the upshift signal and the downshift signal) from the operation device 16.

While the functions of the transmission controller 170 are performed by software, the functions of the transmission controller 170 can be performed by hardware or by a combination of the software and the hardware if needed and/or desired.

The transmission controller 170, the switching device 60, and the guide device 76 are powered by a battery (e.g. a rechargeable battery) which is mounted on the bicycle frame B3 or the base member 18.

The transmission controller 170 stores a transmission route RT1 (FIG. 27) in the memory 170B. FIG. 27 shows a total number of the first teeth 42 in each of the first cogwheels CW11 to CW17, a total number of the second teeth 44 in each of the second cogwheels CW21 to CW27, and gear ratios defined by the first cogwheels CW11 to CW17 and the second cogwheels CW21 to CW27. The transmission route RT1 is defined by thirteen gear ratios among the gear ratios defined by the first cogwheels CW11 to CW17 and the second cogwheels CW21 to CW27. Namely, the transmission controller 170 includes a transmission route memory to store the transmission route RT1 defined by at least two of the gear ratios defined by the first cogwheels CW11 to CW17 and the second cogwheels CW21 to CW27.

To control the switching device 60 and the guide device 76 based on the transmission route RT1 of FIG. 27, the transmission controller 170 stores shift information SF1 defined based on the transmission route RT1 in the memory 170B. As seen in FIG. 28, for example, the shift information SF1 includes combinations of the axial positions of the first transmission member 20 and the positions of the guide member 78 for the speed stages of the bicycle transmission apparatus 14. The transmission controller 170 further stores a current speed stage of the bicycle transmission apparatus 14 in the memory 170B.

As seen in FIG. 26, the switching device 60 includes a first motor driver 172 and a first position sensor 174. The first motor driver 172 controls the switching actuator 62 based on commands and/or signals from the transmission controller 170. The first position sensor 174 senses the axial position of the first transmission member 20. In this embodiment, the first position sensor 174 senses one of a rotational position of the switching actuator 62, a rotational position of the reduction structure 66, and a rotational position of the first shaft 33 to obtain the axial position of the first transmission member 20. While the first position sensor 174 is a potentiometer in this embodiment, the first position sensor 174 can be other sensors such as a rotary encoder if needed and/or desired. The transmission controller 170 stores a current axial position of the first transmission member 20 among the first axial position P1 and the second axial position P2 in the memory 170B. Namely, the transmission controller 170 includes a first position memory to store the current axial position of the first transmission member 20.

The guide device 76 includes a second motor driver 176 and a second position sensor 178. The second motor driver 176 controls the guide actuator 86 based on commands and/or signals from the transmission controller 170. The second position sensor 178 senses the position of the guide member 78. In this embodiment, the second position sensor 178 senses one of a rotational position of the guide actuator 86, a rotational position of the intermediate gear 88, and a rotational position of the guide shaft 82 to obtain the position of the guide member 78. While the second position sensor 178 is a potentiometer in this embodiment, the second position sensor 178 can be other sensors such as a rotary encoder. The transmission controller 170 stores a current position of the guide member 78 in the memory 170B. Namely, the transmission controller 170 includes a second position memory to store the current position of the guide member 78.

The transmission controller 170 controls the switching actuator 62 and the guide actuator 86 based on the operation signal OS (the upshift signal OS1 or the downshift signal OS2) and the transmission route RT1 (e.g., the shift information SF1) stored in the memory 170B.

For example, when the upshift signal OS1 is inputted from the operation device 16 to the transmission controller 170 in a state where the speed stage is in a low gear (FIG. 14), the transmission controller 170 controls the switching actuator 62 to move the first transmission member 20 from the first axial position P1 to the second axial position P2 in the first transmission axial direction D11 (FIGS. 15 and 28). At this time, as seen in FIGS. 15 and 28, the transmission controller 170 controls the guide actuator 86 to keep the guide member 78 at the first guide position P11. Thus, the first transmission member 20 is shifted relative to the second transmission member 22 and the first coupling member 24 in the first transmission axial direction D11. Accordingly, as seen in FIGS. 15, 27, and 28, the first coupling member 24 is shifted from the first cogwheel CW11 to the first cogwheel CW12, changing the speed stage of the bicycle transmission apparatus 14 from low gear to second gear.

When the upshift signal OS1 is inputted from the operation device 16 to the transmission controller 170 in a state where the speed stage is in second gear (FIG. 15), the transmission controller 170 controls the switching actuator 62 to move the first transmission member 20 from the second axial position P2 to the first axial position P1 in the second transmission axial direction D12 (FIGS. 15 and 28). At this time, as seen in FIGS. 16 and 28, the transmission controller 170 controls the guide actuator 86 to move the guide member 78 from the first guide position P11 to the second guide position P12. In this embodiment, the first transmission member 20 and the guide member 78 are substantially simultaneously moved. Thus, the first transmission member 20 and the first coupling member 24 are shifted relative to the second transmission member 22 in the second transmission axial direction D12. Accordingly, as seen in FIGS. 16, 27, and 28, the first coupling member 24 is shifted from the second cogwheel CW27 to the second cogwheel CW26, changing the speed stage of the bicycle transmission apparatus 14 from second gear to third gear.

When the downshift signal OS2 is inputted from the operation device 16 to the transmission controller 170 in a state where the speed stage is in third gear (FIG. 16), the transmission controller 170 controls the switching actuator 62 to move the first transmission member 20 from the first axial position P1 to the second axial position P2 in the first transmission axial direction D11 (FIGS. 15 and 28). At this time, as seen in FIGS. 15 and 28, the transmission controller 170 controls the guide actuator 86 to move the guide member 78 from the second guide position P12 to the first guide position P11. Thus, the first transmission member 20 and the first coupling member 24 are shifted relative to the second transmission member 22 in the first transmission axial direction D11. Accordingly, as seen in FIGS. 15, 27, and 28, the first coupling member 24 is shifted from the second cogwheel CW26 to the second cogwheel CW27, changing the speed stage of the bicycle transmission apparatus 14 from third gear to second gear.

When the downshift signal OS2 is inputted from the operation device 16 to the transmission controller 170 in a state where the speed stage is in second gear (FIG. 15), the transmission controller 170 controls the switching actuator 62 to move the first transmission member 20 from the second axial position P2 to the first axial position P1 in the second transmission axial direction D12 (FIGS. 14 and 28). At this time, as seen in FIGS. 14 and 28, the transmission controller 170 controls the guide actuator 86 to keep the guide member 78 at the first guide position P11. Thus, the first transmission member 20 is shifted relative to the second transmission member 22 and the first coupling member 24 in the second transmission axial direction D12. Accordingly, as seen in FIGS. 14, 27, and 28, the first coupling member 24 is shifted from the first cogwheel CW12 to the first cogwheel CW11, changing the speed stage of the bicycle transmission apparatus 14 from second gear to low gear.

The operation of the bicycle transmission system 12 will be described below referring to FIG. 29.

Figure 29:
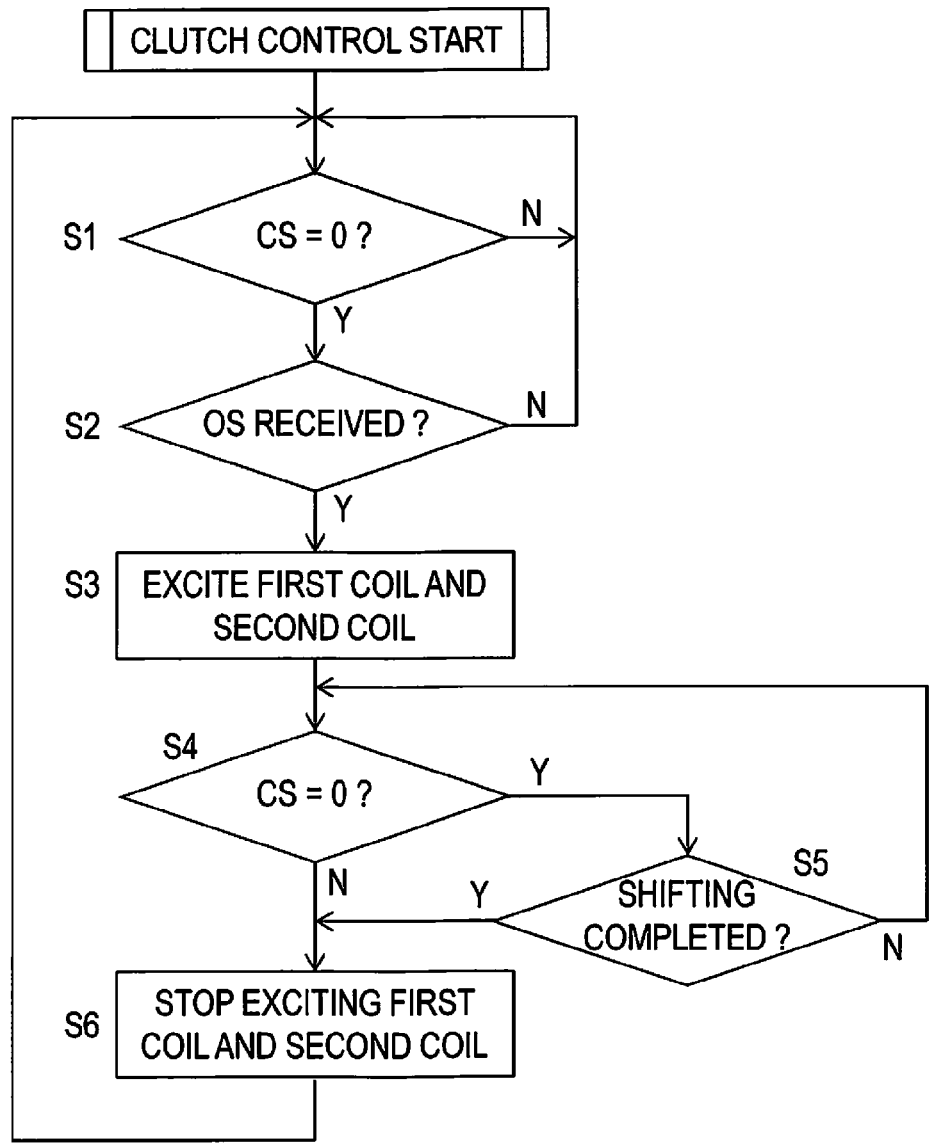
FIG. 29 is a flow chart showing an operation of the bicycle hub assembly illustrated in FIG. 17.

As seen in FIG. 29, the clutch controller 156 determines whether the bicycle 10 is during pedaling or coasting. Specifically, the clutch controller 156 determines whether the cadence CS sensed by the rotational speed sensor 157 is zero (step S1). For example, the cadence CS is zero during coasting, and the cadence CS is not zero during pedaling. The step S1 is repeated when the clutch controller 156 concludes that the cadence CS sensed by the rotational speed sensor 157 is not zero (step S1). Namely, the step S1 is repeated during pedaling. When the clutch controller 156 concludes that the cadence CS sensed by the rotational speed sensor 157 is zero, the clutch controller 156 determines whether the operation signal OS is received by the clutch controller 156 (step S2). The steps S1 and S2 are repeated when the clutch controller 156 concludes that the operation signal OS is not received by the clutch controller 156 (steps S1 and S2).

The first coil C1 and the second coil C2 are excited by the current control circuit 166 when the clutch controller 156 concludes that the operation signal OS is received by the clutch controller 156 (steps S2 and S3). As seen in FIG. 25, the first magnetic field MF1 and the second magnetic field MF2 are generated by the first coil C1 and the second coil C2 during excitation of the first coil C1 and the second coil C2. The first ratchet member 118 and the second ratchet member 120 are moved toward the sprocket support body 108 by a magnetic force generated by the magnetic field. This brings the at least one first tooth 121 into engagement with the at least one second tooth 126, changing the state of the clutch 117 from the first release state to the second coupling state. This allows the bicycle transmission apparatus 14 to change a speed stage among a plurality of speed stages defined by sprocket wheels mounted on the sprocket support body 108 even during coasting. Accordingly, it is possible to utilize a time period of coasting to change the shift position.

The clutch controller 156 determines whether the cadence CS sensed by the rotational speed sensor 157 is zero (step S4). When the clutch controller 156 concludes the cadence CS sensed by the rotational speed sensor 157 remains zero, the clutch controller 156 determines whether the shifting is completed (step S5). When the shifting is completed, the transmission controller 170 transmits a signal determined the shifting is completed via the wireless communication unit WU3. When the shifting is not completed, the step 4 is repeated. Namely, the second coupling state is maintained during coasting. The current control circuit 166 stops exciting the first coil C1 and the second coil C2 when the wireless communication unit WU1 received the signal determined the shifting is completed (steps S5 and S6). The current control circuit 166 stops exciting the first coil C1 and the second coil C2 when the clutch controller 156 concludes that the cadence CS sensed by the rotational speed sensor 157 is not zero (steps S4 and S6). This changes the state of the clutch 117 from the second coupling state to the first release state. The clutch controller 156 can determine whether a predetermined time elapses instead of determining whether the shifting is completed in step S5. When the clutch controller 156 concludes that a predetermined time has elapsed, the clutch controller 156 stops exciting the first coil C1 and the second coil C2. The clutch controller 156 can omit the step S5. In a case where the step S5 is omitted, the clutch controller 156 repeats the step S4 when the clutch controller 156 concludes that the cadence CS sensed by the rotational speed sensor 157 is zero. The clutch controller 156 stops exciting the first coil C1 and the second coil C2 when the clutch controller 156 concludes that the cadence CS sensed by the rotational speed sensor 157 is not zero.

The bicycle transmission apparatus 14 and the bicycle hub assembly 102 include the following features.

(1) With the bicycle hub assembly 102, the clutch 117 has the first coupling state, the first release state, and the second coupling state. In the first coupling state, the pedaling rotational force RF1 is transmitted from the sprocket support body 108 to the hub shell 106 in the first rotational direction RD1 during pedaling. In the first release state, the hub shell 106 is rotatable relative to the sprocket support body 108 in the first rotational direction RD1 during coasting. In the second coupling state, the coasting rotational force RF2 is transmitted from the hub shell 106 to the sprocket support body 108 in the first rotational direction RD1 during coasting. Accordingly, it is possible to rotate the sprocket support body 108 about the rotational axis RA1 in the first rotational direction RD1 even during coasting when a state of the clutch 117 is changed from the first release state to the second coupling state. This allows a bicycle transmission apparatus 14 to change a speed stage among a plurality of speed stages defined by sprocket wheels mounted on the sprocket support body 108 even during coasting. Accordingly, it is possible to utilize a time period of coasting to change the shift position.

(2) The hub shell 106 includes at least one first tooth 121. The sprocket support body 108 includes the first helical spline 128. The clutch 117 includes the first ratchet member 118 and the second ratchet member 120. The first ratchet member 118 includes at least one first ratchet tooth 134 and the second helical spline 136 engaged with the first helical spline 128. The second ratchet member 120 includes at least one second ratchet tooth 144 and at least one second tooth 126. The at least one second ratchet tooth 144 is engageable with the at least one first ratchet tooth 134. The at least one second tooth 126 is engaged with the at least one first tooth 121. Accordingly, the first helical spline 128 and the second helical spline 136 move the first ratchet member 118 relative to the sprocket support body 108 when the first ratchet member 118 rotates relative to the sprocket support body 108. Thus, it is possible to move the first ratchet member 118 relative to the sprocket support body 108 to bring the at least one first ratchet tooth 134 into engagement with the at least one second ratchet tooth 144 using a relative rotation between the first ratchet member 118 and the sprocket support body 108. Accordingly, it is possible to change the state of the clutch 117 between the first coupling state and the first release state.

(3) The clutch 117 includes the actuator 154 to bias the first ratchet member 118 toward the second ratchet member 120 to bring the at least one first ratchet tooth 134 in engagement with the at least one second ratchet tooth 144 using electric power. Accordingly, it is possible to change the state of the clutch 117 between the first release state and the second coupling state using electric power.

(4) The first ratchet member 118 includes iron. The second ratchet member 120 includes iron. The actuator 154 includes the first coil C1 to generate magnetic field to bias the first ratchet member 118 toward the second ratchet member 120. Accordingly, it is possible to move the first ratchet member 118 and the second ratchet member 120 to bring the at least one first ratchet tooth 134 into engagement with the at least one second ratchet tooth 144 using a magnetic force produced by the magnetic field.

(5) The actuator 154 includes the second coil C2 to generate magnetic field to bias the first ratchet member 118 toward the second ratchet member 120. Accordingly, it is possible to increase the magnetic force produced by the magnetic field, allowing the at least one first ratchet tooth 134 to more strongly come into engagement with the at least one second ratchet tooth 144 in the second coupling state.

(6) The second coil C2 is provided radially inward of the first coil C1. Accordingly, it is possible to generate the magnetic field between the first coil C1 and the second coil C2 to produce the magnetic force.

(7) The first coil C1 is provided radially outward of at least one of the first ratchet member 118 and the second ratchet member 120. The second coil C2 is provided radially inward of at least one of the first ratchet member 118 and the second ratchet member 120. Accordingly, it is possible to effectively transmit the magnetic force to the first ratchet member 118 and the second ratchet member 120.

(8) The bicycle hub assembly 102 further comprises the clutch controller 156 to control the electric power applied to the clutch 117. Accordingly, it is possible to easily change the state of the clutch 117 between the first release state and the second coupling state via the clutch controller 156.

(9) The bicycle transmission system 12 comprises the bicycle hub assembly 102, the bicycle transmission apparatus 14, and the one-way clutch 32. The bicycle hub assembly 102 allows the bicycle transmission apparatus 14 to change the speed stage among the plurality of speed stage even during coasting. Accordingly, it is possible to utilize a time period of coasting to change the speed stage.

(10) The bicycle transmission system 12 further comprises the operation device 16 to generate the operation signal OS in response to the user input UI. The bicycle hub assembly 102 includes the clutch controller 156 to control the electric power applied to the clutch 117 in response to the operation signal OS. Accordingly, it is possible to operate the bicycle hub assembly 102 via the operation device 16.

(11) The bicycle transmission apparatus 14 is operated based on the operation signal OS. Accordingly, it is possible to operate the bicycle transmission apparatus 14 via the operation device 16 in addition to the bicycle hub assembly 102.

(12) The clutch controller 156 changes the state of the clutch 117 to the second coupling state based on the operation signal OS when the bicycle crank B7 does not rotate. Accordingly, it is possible to change the state of the clutch 117 to the second coupling state by operating the operation device 16 during coasting.

(13) The bicycle transmission system 12 further comprises the rotational speed sensor 157 to sense the rotational speed of the bicycle crank B7. Accordingly, it is possible to utilize the rotational speed sensed by the rotational speed sensor 157 in order to control the state of the clutch 117.

(14) The clutch controller 156 controls the clutch 117 to keep the second coupling state in a case where the clutch controller 156 receives the operation signal OS when the bicycle crank B7 rotates. Accordingly, it is possible to keep the second coupling state while the operation signal OS is received during coasting.

Second Embodiment

A bicycle transmission system 212 including a bicycle hub assembly 302 in accordance with a second embodiment will be described below referring to FIGS. 30 to 33. The bicycle transmission system 212 has the same structure and/or configuration as those of the bicycle transmission system 12 except for the clutch. Thus, elements having substantially the same function as those in the first embodiment will be numbered the same here, and will not be described and/or illustrated again in detail here for the sake of brevity.

Figure 30:
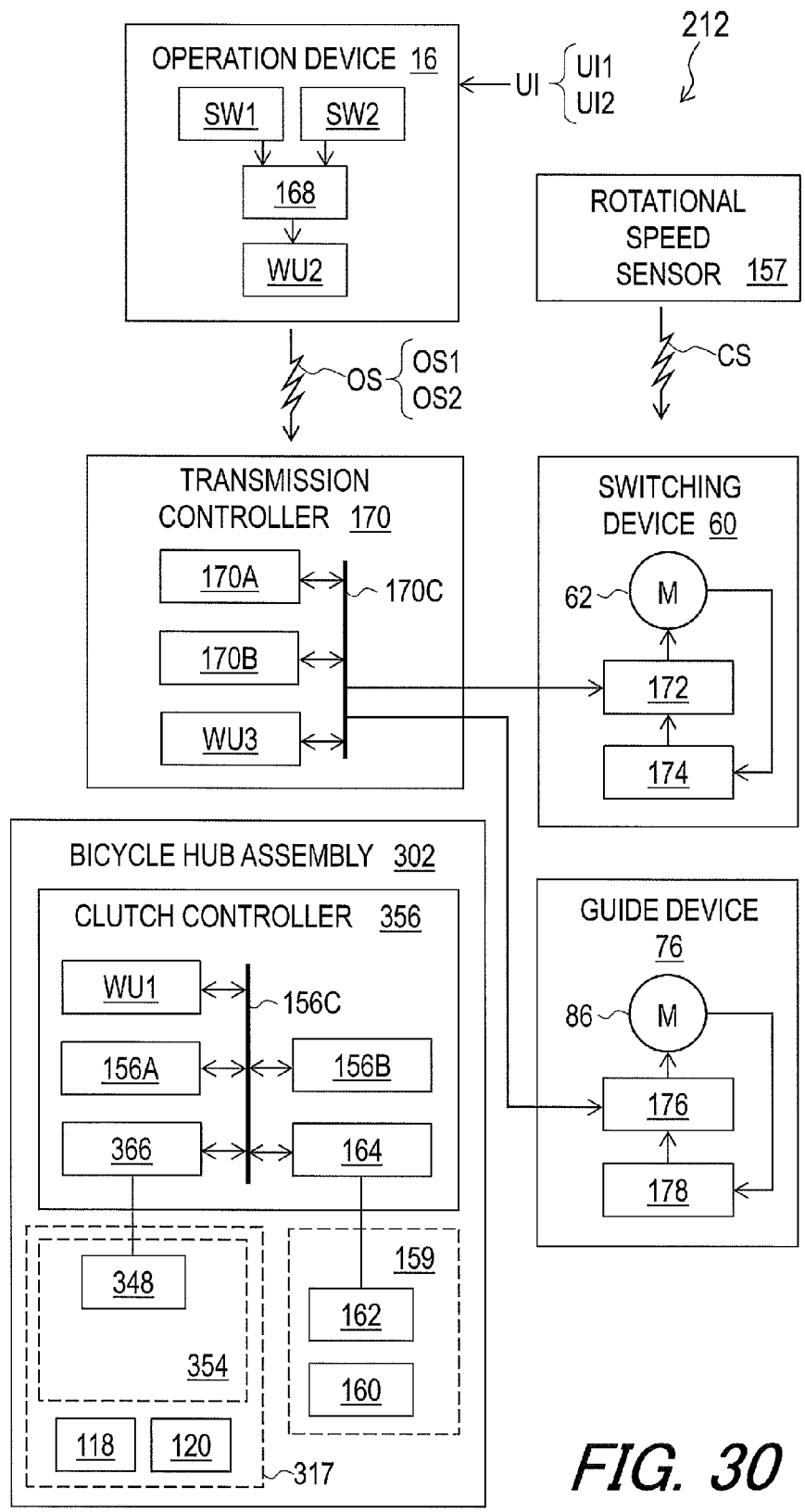
FIG. 30 is a block diagram of a bicycle transmission system in accordance with a second embodiment.
Figure 31:
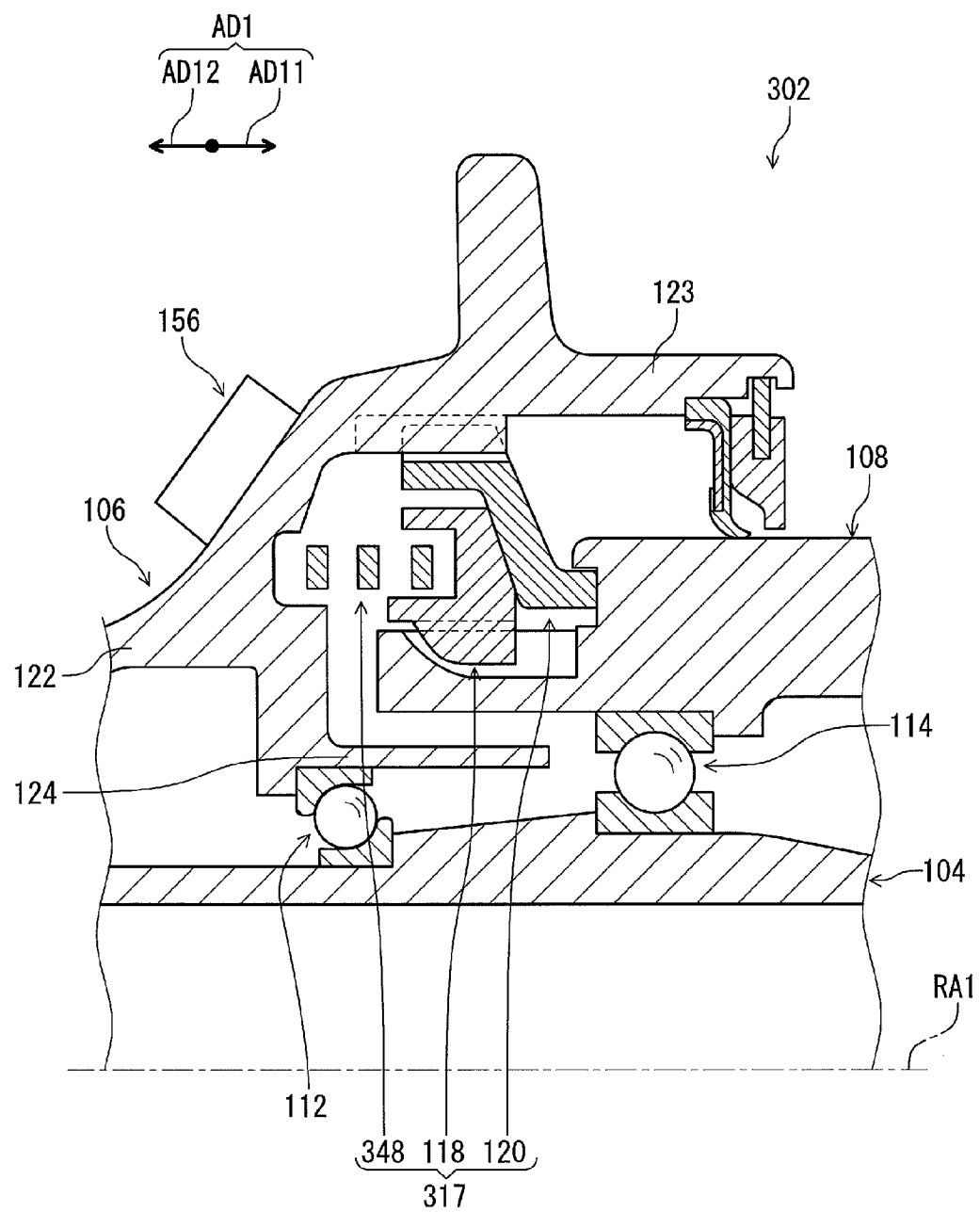
FIG. 31 is a partial enlarged cross-sectional view of a bicycle hub assembly of the bicycle transmission system illustrated in FIG. 30.

As seen in FIG. 30, the bicycle hub assembly 302 comprises a clutch 317 and a clutch controller 356. The clutch 317 has the same structure and/or configuration as those of the clutch 117 of the first embodiment. The clutch controller 356 has the same structure and/or configuration as those of the clutch controller 156 of the first embodiment. The clutch 317 includes an actuator 354. The actuator 354 has the same structure and/or configuration as those of the actuator 154 of the first embodiment. As seen in FIG. 31, however, the actuator 354 includes a shape-memory spring 348 instead of the biasing member 148 of the first embodiment. The shape-memory spring 348 has substantially the same shape as that of the biasing member 148. Unlike the biasing member 148, however, the shape-memory spring 348 is made of a shape memory alloy. The shape-memory spring 348 remembers an original shape in a free state at a predetermined temperature higher than a normal temperature. The shape-memory spring 348 returns to the original shape when the shape-memory spring 348 is heated to the predetermined temperature.

The first ratchet member 118 is provided between the shape-memory spring 348 and the second ratchet member 120. The shape-memory spring 348 is provided between the hub shell 106 and the first ratchet member 118. The shape-memory spring 348 is provided between the hub shell 106 and the first ratchet member 118 to bias the first ratchet member 118 toward the second ratchet member 120.

Figure 32:
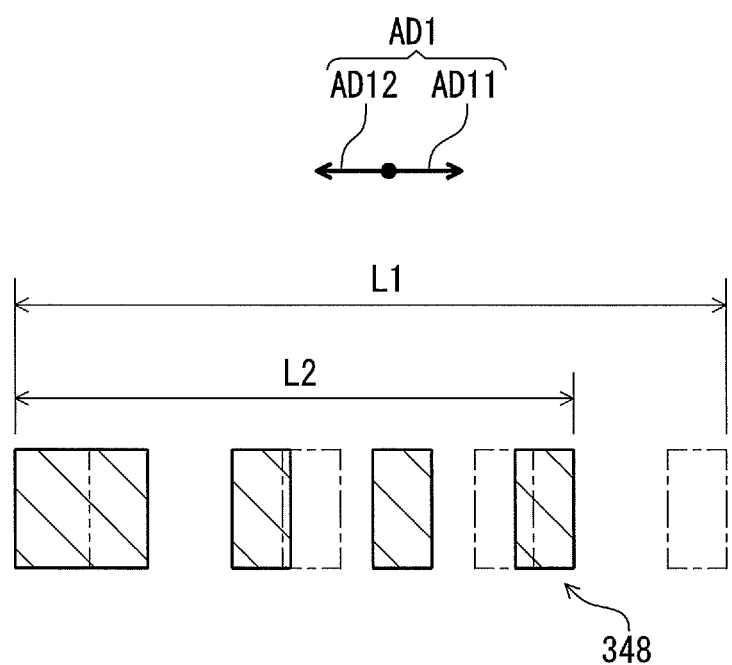
FIG. 32 is a schematic diagram of a shape-memory spring of the bicycle hub assembly of the bicycle transmission system illustrated in FIG. 30.

As seen in FIG. 32, the shape-memory spring 348 has an axial length which is variable in accordance with the electric power applied to the shape-memory spring 348. Specifically, the shape-memory spring 348 has a first axial length L1 when the electric power is applied to the shape-memory spring 348. The shape-memory spring 348 has a second axial length L2 when the electric power is not applied to the shape-memory spring 348. The first axial length L1 is longer than the second axial length L2. For example, the first axial length L1 corresponds to the predetermined temperature, and the second axial length L2 corresponds to the normal temperature. The axial length of the shape-memory spring 348 increases from the second axial length L2 to the first axial length L1 when a temperature of the shape-memory spring 348 increases from the normal temperature to the predetermined temperature. The axial length of the shape-memory spring 348 decreases from the first axial length L1 to the second axial length L2 when a temperature of the shape-memory spring 348 decreases from the predetermined temperature to the normal temperature.

In a state where the shape-memory spring 348 is provided between the hub shell 106 and the first ratchet member 118, an increase in the temperature of the shape-memory spring 348 increases a biasing force applied from the shape-memory spring 348 to the first ratchet member 118. A decrease in the temperature of the shape-memory spring 348 decreases the biasing force applied from the shape-memory spring 348 to the first ratchet member 118. Namely, an increase in the electric power applied to the shape-memory spring 348 increases the biasing force applied from the shape-memory spring 348 to the first ratchet member 118. A decrease in the electric power applied to the shape-memory spring 348 decreases the biasing force applied from the shape-memory spring 348 to the first ratchet member 118.

As seen in FIG. 30, the clutch controller 356 includes a current control circuit 366 to control the DC current supplied from the rectification circuit 164 to the shape-memory spring 348. The current control circuit 366 is electrically connected to the rectification circuit 164 and the processor 156A via the bus 156C. The current control circuit 366 is electrically connected to the shape-memory spring 348. The clutch controller 356 stores a current value corresponding to the predetermined temperature in the memory 156B. The current control circuit 366 supplies the DC current to the shape-memory spring 348 based on the current value to increase the temperature of the shape-memory spring 348 to the predetermined temperature. This changes the axial length of the shape-memory spring 348 from the second axial length L2 to the first axial length L1.

Figure 33:
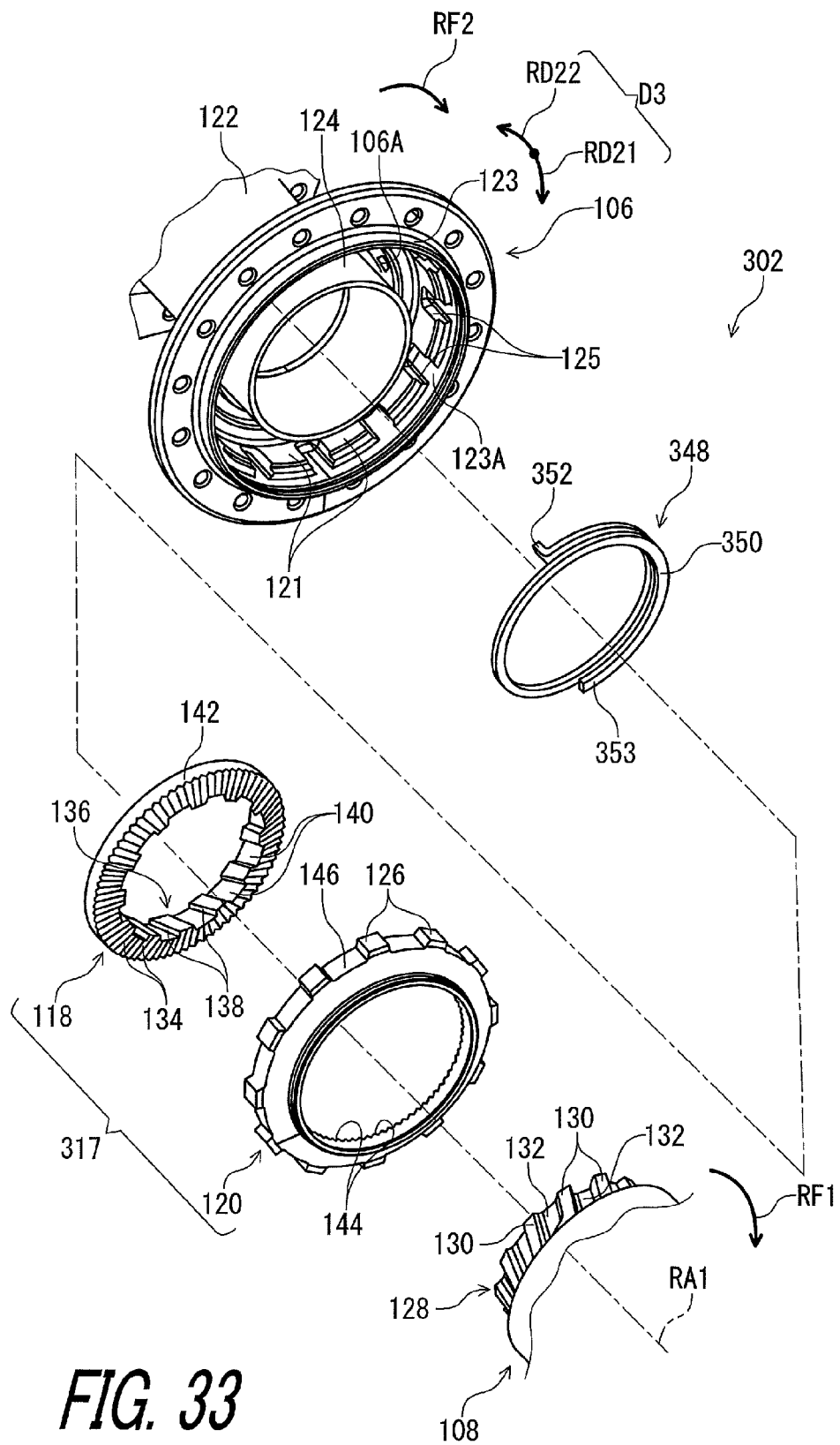
FIG. 33 is an exploded perspective view of the bicycle hub assembly of the bicycle transmission system illustrated in FIG. 30.

As seen in FIG. 33, the shape-memory spring 348 includes a coiled body 350, a first end 352, and a second end 353. The first end 352 and the second end 353 are electrically connected to the current control circuit 366 via wires (not shown). The current control circuit 366 supplies the DC current to the first end 352 in response to the operation signal OS when the bicycle crank B7 does not rotate. The current control circuit 366 stops supplying the DC current to the first end 352 when the bicycle crank B7 rotates.

The shape-memory spring 348 expands from the second axial length L2 to the first axial length L1 when the DC current is supplied from the current control circuit 366 to the shape-memory spring 348. This increase the biasing force of the shape-memory spring 348, biasing the first ratchet member 118 toward the second ratchet member 120. This brings the first ratchet teeth into engagement with the second ratchet teeth, changing the state of the clutch from the first release state to the second coupling state.

The operation of the bicycle hub assembly 302 is substantially the same as that of the bicycle hub assembly 102 of the first embodiment except for the above operation of the shape-memory spring 348. Thus, it will not be described and/or illustrated in detail here for the sake of brevity.

With the bicycle transmission system 212, it is possible to obtain the same effects as those of the bicycle transmission system 12 in accordance with the first embodiment. Furthermore, the bicycle hub assembly 302 includes the following features.

(1) With the bicycle hub assembly 302, the clutch 317 includes the shape-memory spring 348 having the axial length which is variable in accordance with the electric power applied to the shape-memory spring 348. Accordingly, it is possible to change a biasing force transmitted from the shape-memory spring 348 to the first ratchet member 118 using the electric power.

(2) The shape-memory spring 348 has the first axial length L1 when the electric power is applied to the shape-memory spring 348. The shape-memory spring 348 has the second axial length L2 when the electric power is not applied to the shape-memory spring 348. The first axial length L1 is longer than the second axial length L2. Accordingly, it is possible to change the biasing force between a force corresponding to the first axial length L1 and a force corresponding to the second axial length L2. Thus, it is possible to change the state of the clutch 317 between the first release state and the second coupling state by switching length of the shape-memory spring 348 between the first axial length L1 and the second axial length L2.

(3) The first ratchet member 118 is provided between the shape-memory spring 348 and the second ratchet member 120. Accordingly, it is possible to bias the first ratchet member 118 toward the second ratchet member 120 with the shape-memory spring 348.

(4) The shape-memory spring 348 is provided between the hub shell 106 and the first ratchet member 118. Accordingly, it is possible to utilize a space provided between the hub shell 106 and the first ratchet member 118 for the shape-memory spring 348.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle hub assembly comprising:
a hub axle defining a rotational axis;
a hub shell rotatably mounted on the hub axle to rotate about the rotational axis;
a sprocket support body rotatably mounted on the hub axle to rotate about the rotational axis, the sprocket support body being rotatable relative to the hub axle and the hub shell about the rotational axis; and
a clutch having a first coupling state where a pedaling rotational force is transmitted from the sprocket support body to the hub shell in a first rotational direction during pedaling, a first release state where the hub shell receives a rotational force that rotates the hub shell relative to the sprocket support body in the first rotational direction during coasting, and a second coupling state where a coasting rotational force is transmitted from the hub shell to the sprocket support body in the first rotational direction during coasting.

2. The bicycle hub assembly according to claim 1, wherein the hub shell includes at least one first tooth,
the sprocket support body includes a first helical spline,
the clutch includes
  a first ratchet member including
    at least one first ratchet tooth, and
    a second helical spline engaged with the first helical spline, and
  a second ratchet member including
    at least one second ratchet tooth engageable with the at least one first ratchet tooth, and
    at least one second tooth engaged with the at least one first tooth.

3. A bicycle hub assembly comprising:
a hub axle defining a rotational axis;
a hub shell rotatably mounted on the hub axle to rotate about the rotational axis;
a sprocket support body rotatably mounted on the hub axle to rotate about the rotational axis, the sprocket support body being rotatable relative to the hub axle and the hub shell about the rotational axis; and
a clutch having
  a first coupling state where a pedaling rotational force is transmitted from the sprocket support body to the hub shell in a first rotational direction during pedaling,
  a first release state where the hub shell is rotatable relative to the sprocket support body in the first rotational direction during coasting, and
  a second coupling state where a coasting rotational force is transmitted from the hub shell to the sprocket support body in the first rotational direction during coasting, wherein
the hub shell includes at least one first tooth,
the sprocket support body includes a first helical spline,
the clutch includes
  a first ratchet member including
    at least one first ratchet tooth, and
    a second helical spline engaged with the first helical spline, and
  a second ratchet member including
    at least one second ratchet tooth engageable with the at least one first ratchet tooth, and
    at least one second tooth engaged with the at least one first tooth, and
the clutch includes an actuator to bias the first ratchet member toward the second ratchet member to bring the at least one first ratchet tooth in engagement with the at least one second ratchet tooth using electric power.

4. The bicycle hub assembly according to claim 3, wherein
the first ratchet member includes iron,
the second ratchet member includes iron, and
the actuator includes a first coil to generate magnetic field to bias the first ratchet member toward the second ratchet member.

5. The bicycle hub assembly according to claim 4, wherein
the actuator includes a second coil to generate magnetic field to bias the first ratchet member toward the second ratchet member.

6. The bicycle hub assembly according to claim 5, wherein
the second coil is provided radially inward of the first coil.

7. The bicycle hub assembly according to claim 5, wherein
the first coil is provided radially outward of at least one of the first ratchet member and the second ratchet member, and
the second coil is provided radially inward of at least one of the first ratchet member and the second ratchet member.

8. The bicycle hub assembly according to claim 3, wherein
the actuator includes a shape-memory spring having an axial length which is variable in accordance with the electric power applied to the shape-memory spring.

9. The bicycle hub assembly according to claim 8, wherein
the shape-memory spring has a first axial length when the electric power is applied to the shape-memory spring,
the shape-memory spring has a second axial length when the electric power is not applied to the shape-memory spring, and
the first axial length is longer than the second axial length.

10. The bicycle hub assembly according to claim 8, wherein
the first ratchet member is provided between the shape-memory spring and the second ratchet member.

11. The bicycle hub assembly according to claim 8, wherein
the shape-memory spring is provided between the hub shell and the first ratchet member.

12. The bicycle hub assembly according to claim 3, further comprising:
a clutch controller to control the electric power applied to the clutch.

13. A bicycle transmission system comprising:
the bicycle hub assembly according to claim 1;
a bicycle transmission apparatus coupling a bicycle crank to the sprocket support body of the bicycle hub assembly to transmit the pedaling rotational force, the bicycle transmission apparatus having a plurality of speed stages; and
a one-way clutch disposed on a transmission path defined between the bicycle crank and the bicycle transmission apparatus.

14. A bicycle transmission system comprising:
a bicycle hub assembly comprising:
  a hub axle defining a rotational axis;
  a hub shell rotatably mounted on the hub axle to rotate about the rotational axis;
  a sprocket support body rotatably mounted on the hub axle to rotate about the rotational axis, the sprocket support body being rotatable relative to the hub axle and the hub shell about the rotational axis;
  a clutch having a first coupling state where a pedaling rotational force is transmitted from the sprocket support body to the hub shell in a first rotational direction during pedaling, a first release state where the hub shell is rotatable relative to the sprocket support body in the first rotational direction during coasting, and a second coupling state where a coasting rotational force is transmitted from the hub shell to the sprocket support body in the first rotational direction during coasting;

a bicycle transmission apparatus coupling a bicycle crank to the sprocket support body of the bicycle hub assembly to transmit the pedaling rotational force, the bicycle transmission apparatus having a plurality of speed stages;

a one-way clutch disposed on a transmission path defined between the bicycle crank and the bicycle transmission apparatus; and an operation device to generate an operation signal in response to a user input, wherein the bicycle hub assembly includes a clutch controller to control the electric power applied to the clutch in response to the operation signal.

15. The bicycle transmission system according to claim 14, wherein the bicycle transmission apparatus is operated based on the operation signal.

16. The bicycle transmission system according to claim 14, wherein
the clutch controller changes a state of the clutch to the second coupling state based on the operation signal when the bicycle crank does not rotate.

17. The bicycle transmission system according to claim 16, further comprising:
a rotational speed sensor to sense a rotational speed of the bicycle crank.

18. The bicycle transmission system according to claim 16, wherein
the clutch controller controls the clutch to keep the second coupling state in a case where the clutch controller receives the operation signal when the bicycle crank rotates.

19. The bicycle hub assembly according to claim 1, further comprising:
a clutch controller configured to control the clutch to enter the second coupling state based on an operation signal.

20. The bicycle hub assembly according to claim 1, further comprising:
a clutch controller configured to control the clutch to enter the second coupling state based on an operation signal and a determination that a bicycle crank does not rotate.

* * * * *